(12) United States Patent
Ogami et al.

(10) Patent No.: US 12,246,988 B2
(45) Date of Patent: Mar. 11, 2025

(54) INFERENCE METHOD, QUALITY CONTROL METHOD, CHEMICALLY STRENGTHENED GLASS, INFERENCE PROGRAM, STORAGE MEDIUM, INFERENCE DEVICE, AND METHOD OF MANUFACTURING CHEMICALLY STRENGTHENED GLASS

(71) Applicant: AGC Inc., Tokyo (JP)

(72) Inventors: Satoshi Ogami, Tokyo (JP); Kenji Imakita, Tokyo (JP)

(73) Assignee: AGC Inc., Tokyo (JP)

( * ) Notice: Subject to any disclaimer, the term of this patent is extended or adjusted under 35 U.S.C. 154(b) by 61 days.

(21) Appl. No.: 17/663,312

(22) Filed: May 13, 2022

(65) Prior Publication Data

US 2022/0380250 A1    Dec. 1, 2022

(30) Foreign Application Priority Data

May 25, 2021 (JP) .................................. 2021-087545

(51) Int. Cl.
*C03C 21/00* (2006.01)
*C03B 18/12* (2006.01)
*G01L 1/24* (2006.01)

(52) U.S. Cl.
CPC ............ *C03C 21/002* (2013.01); *C03B 18/12* (2013.01); *G01L 1/241* (2013.01)

(58) Field of Classification Search
CPC ....... C03C 21/002; C03C 21/00; C03B 18/12; G01L 1/241; G06N 5/04
See application file for complete search history.

(56) References Cited

U.S. PATENT DOCUMENTS

2019/0219463 A1    7/2019  Orihara et al.

FOREIGN PATENT DOCUMENTS

| CN | 114057410 A | * | 2/2022 | |
| CN | 114627973 A | * | 6/2022 | |
| WO | WO 2019/163989 A1 | | 8/2019 | |
| WO | WO-2020045093 A1 | * | 3/2020 | ............. C03C 21/00 |

* cited by examiner

*Primary Examiner* — Manuel L Barbee
(74) *Attorney, Agent, or Firm* — Oblon, McClelland, Maier & Neustadt, L.L.P.

(57) ABSTRACT

An inference method includes inferring a value that includes a stress value in a region located 50 μm or shallower from a surface of a chemically strengthened glass, by receiving as input at least a temperature and a time used upon chemical strengthening, and stress values at three or more different depth positions 20 μm or deeper from the surface of the chemically strengthened glass that has been obtained by chemically strengthening a glass having a thickness of 0.2 mm or greater with the temperature and the time.

15 Claims, 12 Drawing Sheets

FIG.11
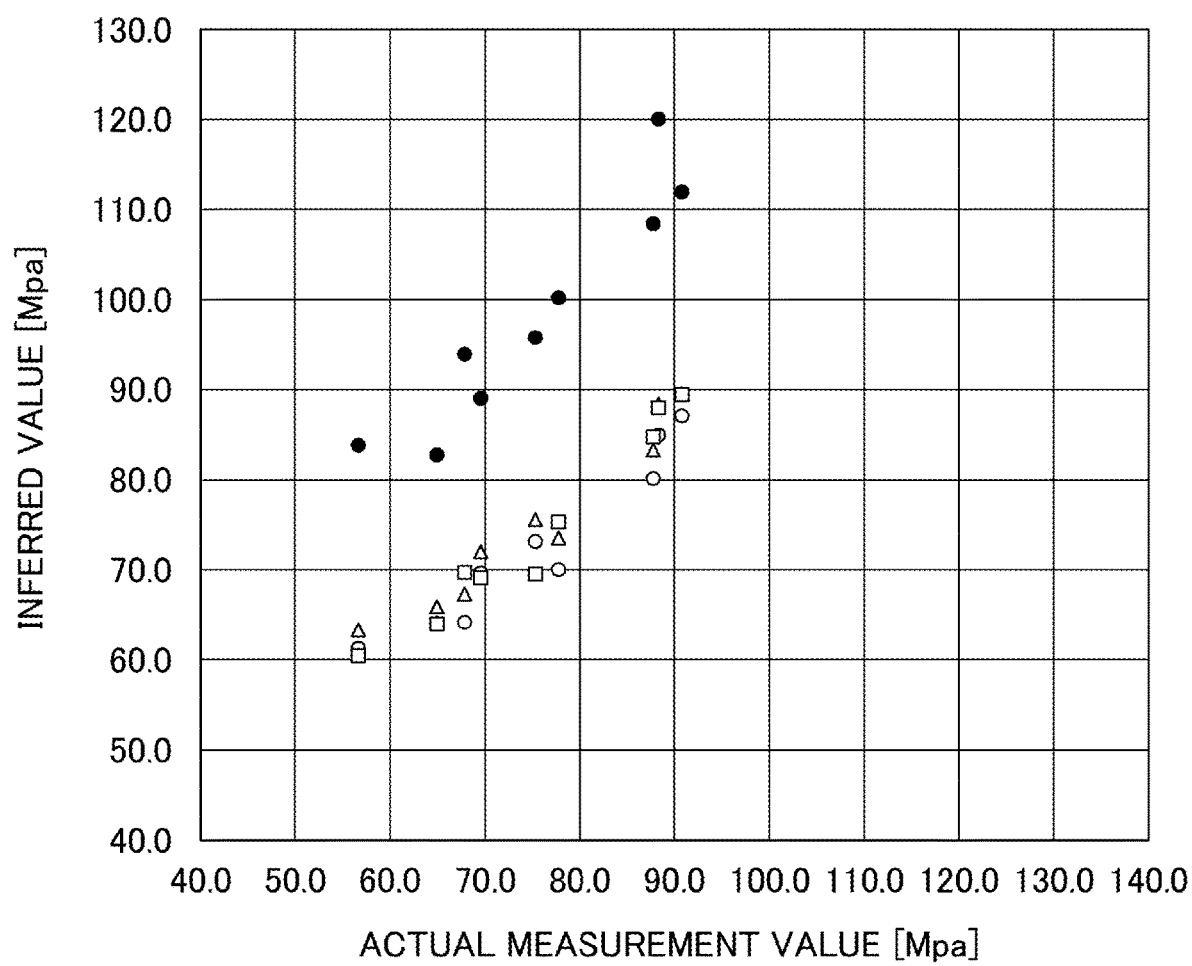
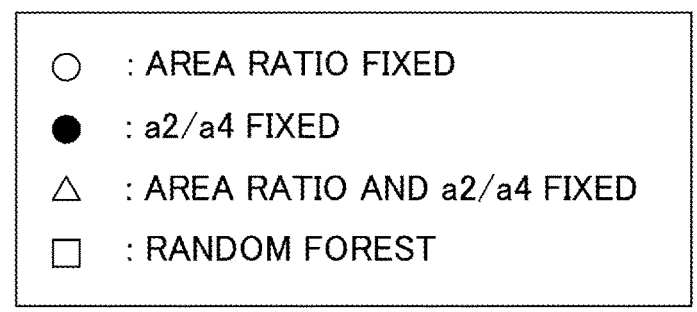

INFERENCE METHOD, QUALITY CONTROL METHOD, CHEMICALLY STRENGTHENED GLASS, INFERENCE PROGRAM, STORAGE MEDIUM, INFERENCE DEVICE, AND METHOD OF MANUFACTURING CHEMICALLY STRENGTHENED GLASS

CROSS-REFERENCE TO RELATED APPLICATIONS

The present application is based upon and claims the benefit of priority under 35 U.S.C. § 119 of Japanese Patent Application No. 2021-087545 filed on May 25, 2021, the entire contents of which are hereby incorporated by reference.

TECHNICAL FIELD

The present disclosure relates to an inference method, a quality control method, chemically strengthened glass, an inference program, a storage medium, an inference device, and a method of manufacturing chemically strengthened glass.

BACKGROUND ART

Chemically strengthened glass that is strengthened by forming a surface layer (ion-exchanged layer) on a glass surface by ion exchange, has been used for display parts, housing bodies, and the like of electronic devices such as mobile phones and smartphones. Generally, the stress value of the surface of chemically strengthened glass is measured in advance before being shipped to the market, by using optical techniques and the like to confirm whether the glass is correctly strengthened.

As methods of measuring stresses of the surface layer and inner part of a strengthened glass, for example, a scattered light photoelastic stress method or the like is available, in which the stress distribution of the surface layer is measured non-destructively by using a phenomenon that the phase difference between an s-polarized component and a p-polarized component observed from scattered light of laser propagating through the glass in which the internal stress is present, is dependent on the magnitude of the stress (photoelastic effect). The scattered light photoelastic stress method is a type of method used in non-destructive inspection, and is executed by using a scattered light photoelastic stress meter or the like. Measurement using the scattered light photoelastic stress method is also called SLP measurement.

As a method of measuring stresses of the surface layer and inner part of a strengthened glass using the scattered light photoelastic stress method, for example, a method of evaluating a strengthened glass is disclosed, in which by using multiple images that capture scattered light generated by having laser light incident on a strengthened glass, a phase change in the brightness change in the scattered light is calculated, and then, a first stress distribution in the depth direction from the surface of the strengthened glass is calculated based on the phase change, to measure a physical quantity related to the strength of the strengthened glass by using the multiple images (see, for example, Re-publication of PCT International Publication of WO2019/163989 (Patent Document 1)).

Meanwhile, as a method of measuring the stress of the surface layer non-destructively, other than the scattered light photoelastic stress method, there is a method that uses an optical waveguide effect caused by a refractive index distribution formed on the surface layer due to chemical strengthening, to measure (FSM measurement) the stress from observed modes using an optical waveguide surface stress meter (e.g., FSM-6000, manufactured by Orihara industrial co., ltd.). However, measurement by this method is only applicable to specific cases of the refractive index, and this is not a method that can be used generally. In particular, this method cannot be used for a lithium-containing aluminosilicate glass having ion exchange applied with sodium salt; a crystallized glass having a large internal haze; and the like.

Here, in order to appropriately execute development for finding proper chemical strengthening conditions, and quality control of manufactured glass, it is important to accurately measure the stress profile of a chemically strengthened glass.

However, as in the evaluation method of strengthened glass of Patent Document 1 and the like, in the stress measuring method of the surface layer of the strengthened glass using the scattered light photoelastic stress method, stress values in a shallow region located 50 µm or shallower from the surface of the chemically strengthened glass could not be measured with high accuracy. Therefore, for example, as stress values in a shallow region located 50 µm or shallower from the surface of a chemically strengthened glass, values evaluated with destructive inspection using an electronic probe microanalyzer (EPMA), a microscopic region birefringence measuring device (e.g., Abrio Micro Imaging System, Hinds Instruments, Inc.), or the like have been used.

Therefore, there has been a need for a method that uses the scattered light photoelastic stress method, and is capable of inferring a stress value in a shallow region located 50 µm or shallower from the surface of a chemically strengthened glass, that is almost equivalent to a value that would be obtained with destructive inspection, without actually executing the destructive inspection.

SUMMARY

According to one embodiment in the present disclosure, an inference method includes inferring a value that includes a stress value in a region located 50 µm or shallower from a surface of a chemically strengthened glass, by receiving as input at least a temperature and a time used upon chemical strengthening, and stress values at three or more different depth positions 20 µm or deeper from the surface of the chemically strengthened glass that has been obtained by chemically strengthening a glass having a thickness of 0.2 mm or greater with the temperature and the time.

BRIEF DESCRIPTION OF DRAWINGS

FIG. 11 is a diagram illustrating a relationship between actual measurement values of CS20 obtained with SLP measurement, and inferred values of CS20 according to a function or model.

EMBODIMENTS FOR CARRYING OUT THE INVENTION

Figure 1:
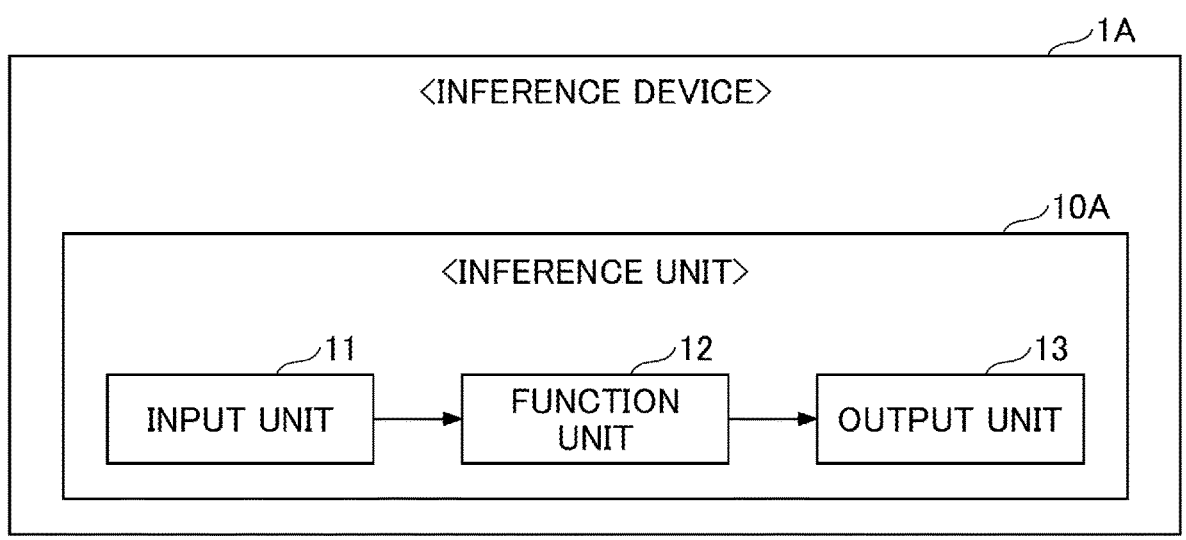
FIG. 1 is a block diagram illustrating a general configuration of an inference device that executes an inference method according to a first embodiment in the present disclosure.

In the following, embodiments in the present disclosure will be described in detail.

According to one embodiment of the inference method in the present disclosure, a stress value in a shallow region located 50 μm or shallower from the surface of a chemically strengthened glass can be inferred highly accurately.

Note that in order to make the description easier to understand, throughout the drawings, the same reference numerals are assigned to the same elements, and duplicate descriptions are omitted. Also, in the present specification, a symbol "~" indicating a numerical range means that numerical values shown before and after the symbol are included in the range as the lower limit value and the upper limit value unless otherwise noted.

First Embodiment

Inference Device

An inference device that executes an inference method according to the first embodiment in the present disclosure will be described. FIG. 1 is a block diagram illustrating a general configuration of an inference device that executes an inference method according to the present embodiment. As illustrated in FIG. 1, an inference device 1A that executes the inference method according to the present embodiment includes an inference unit 10A, and by receiving as input into the inference unit 10A at least a temperature and a time used upon chemical strengthening, and stress values at three or more different depth positions 20 μm or deeper from the surface of a chemically strengthened glass that has been obtained by chemically strengthening a glass having a thickness of 0.2 mm or greater with the temperature and the time, can infer values including a stress value in a region located 50 μm or shallower from the surface of the chemically strengthened glass highly accurately.

Note that the region located 50 μm or shallower from the surface of a chemically strengthened glass refers to a range of depth from 0 μm to 50 μm of the chemically strengthened glass when defining the depth at the surface of the chemically strengthened glass as 0 μm, and the range of depth of the chemically strengthened glass includes, for example, positions at depths of 0 μm, 10 μm, 20 μm, 30 μm, 40 μm, and 50 μm.

A chemically strengthened glass is obtained by chemical strengthening of a glass.

As the material of glass, a material commonly used for glass is used; for example, soda lime silica glass, borosilicate glass, aluminosilicate glass, and the like may be enumerated. Also, the glass may be a crystallized glass.

The glass may have a thickness of 0.2 mm or thicker. The shape of the glass may be of any suitable shape, and the outer shape of the glass in plan view may be rectangular, circular, elliptic, or the like.

Chemical strengthening is a process of replacing ions included in a principal surface of the glass, for example, such as Li ions and Na ions having small ion radiuses, with ions having relatively large ion radius, for example, such as K ions, to form a strengthened layer within a predetermined depth from the principal surface of the glass (also referred to as an ion-exchanged layer or compressive stress layer). By chemically strengthening a glass to form a strengthened layer on the principal surface of the glass, the strength of the glass can be improved, and breakage of the glass due to contact or the like can be suppressed.

The chemical strengthening method is not limited in particular; for example, an ion exchange method is adopted in which a non-chemically strengthened glass is immersed in a heated strengthening process liquid (molten salt) to replace alkali ions having a relatively small ion radius (e.g., Li ions and Na ions) contained in the glass with alkali ions having a greater ion radius (e.g., Na ions and K ions). Also, as an alternative chemical strengthening method, there is a method that is executed by applying a paste including alkali ions having greater ion radius to the principal surface of the glass. Also, there is a method in which by replacement with alkali ions having a smaller ion radius (e.g. from Na ions to Li ions), the shape of the stress profile is made to have a special shape.

The number of times of applying chemical strengthening is not limited in particular, and may be once or may be multiple times. In the case of executing chemical strengthening twice, during the first chemical strengthening, $NaNO_3$ salt may be used as the molten salt, to replace Li ions in the glass with Na ions in the molten salt, so as to inject Na ions into the glass. Then, during the second chemical strengthening, mixed molten salt of $KNO_3$ and $LiNO_3$ salt may be used, to replace mainly Na ions in the glass with mainly K ions in the mixed molten salt, so as to inject K ions into the glass. At this time, due to the difference in diffusivity between Na ions and K ions, Na ions penetrate into the deep inside of the glass, whereas K ions penetrate into the glass only by a few μm (around 10 μm at most). In other words, K ions do not normally reach a range deeper than 20 μm beyond which measurement (SLP measurement) using the scattered light photoelastic stress method can be executed properly. Therefore, in the case of executing chemical strengthening multiple times, what can be measured with SLP measurement as non-destructive inspection is a stress due to the concentration gradient of Na ions. Accordingly, in the present embodiment, stress caused by ion species that do not diffuse into a depth deeper than 20 μm is excluded from consideration.

The inference unit 10A as a part of the inference device 1A will be described. As illustrated in FIG. 1, the inference unit 10A includes an input unit 11, a function unit 12, and an output unit 13.

The input unit 11 receives, as the input information, at least a temperature and a time used upon chemical strengthening, and stress values at three or more different depth positions 20 μm or deeper from the surface of a chemically strengthened glass obtained by chemically strengthening a glass with the temperature and the time.

Note that as described above, "the temperature and the time" when the glass is chemically strengthened are not limited to the case of being strictly equivalent to "a temperature and a time" used upon chemical strengthening, and may include a certain degree of error with respect to a temperature and a time used upon chemical strengthening.

The three or more different depth positions located 20 μm or deeper from the surface of a chemically strengthened glass can be selected appropriately depending on the size, thickness, material, and the like of the chemically strengthened glass; for example, 50 μm, 70 μm, 180 μm, and the like from the surface of the chemically strengthened glass may be enumerated.

Note that at a depth of 20 μm to 50 μm from the surface of the chemically strengthened glass, as will be described later, although a stress value measured by SLP measurement as a non-destructive inspection method has significant error compared to a stress value measured by using a destructive inspection method, in the case of using the stress value at a depth of 20 μm to 50 μm, a greater number of stress values at positions deeper than 50 μm may be input as the input information. For example, it is favorable to include stress values at two or more positions deeper than 50 μm. Also, for example, it is favorable that the number of stress values at positions deeper than 50 μm is greater than the number of stress values at 20 μm to 50 μm. Further, it is more favorable to use only stress values at positions deeper than 50 μm.

The function unit 12 applies the input information input into the input unit 11 to a function having three terms or more, to infer a stress value in a region located 50 μm or shallower from the surface of a chemically strengthened glass as inference information.

Before executing inference, the function unit 12 may infer a stress value in a region located 50 μm or shallower from the surface of a chemically strengthened glass, by using a result obtained by measuring one or more training samples that have been chemically strengthened under sample conditions for chemical strengthening.

The sample conditions for chemical strengthening are set, for example, temperature (Ti) [unit: ° C.], time (ti) [unit: h], and salt concentration (ci) [unit: %] in the strengthening conditions of a chemically strengthened glass to be inferred (these will be referred to as sample conditions of inference), within ranges of ±30° C., ±1 h, and ±10%, respectively. A sample for chemical strengthening refers to one or more chemically strengthened glasses produced under the same sample conditions for chemical strengthening. It is favorable that the sample conditions for chemical strengthening are the same conditions as the sample conditions of inference.

The function unit 12 may apply stress values at three or more different depth positions located 20 μm or deeper from the surface of a chemically strengthened glass, to a function having three terms or more, to infer a stress value in a region located 50 μm or shallower from the surface of a chemically strengthened glass.

Two or more terms of the function having three terms or more may be at least one of a complementary error function (erfc) and an error function (erf).

As the function having three terms or more, for example, it is favorable to use the following Formula (1), and considering chemical strengthening applied to the back surface of a glass, it is more favorable to use the following Formula (1)'.

$$\sigma(x) = a_1 \cdot \text{erfc}(a_2 \cdot x) + a_3 \cdot \text{erfc}(a_4 \cdot x) + a_5 \ldots \quad (1)$$

$$\sigma(x) = a_1 \cdot \text{erfc}(a_2 \cdot x) + a_3 \cdot \text{erfc}(a_4 \cdot x) + a_1 \cdot \text{erfc}(a_2 \cdot x') + a_3 \cdot \text{erfc}(a_4 \cdot x') + a_5 \ldots \quad (1)'$$

where in Formulas (1) and (1)', σ is a stress value in the depth direction from the surface of the chemically strengthened glass, and x is a depth from the surface of the chemically strengthened glass, x' is (T/2−x), and a1 to a5 are parameters used for prediction.

Here, a5 in Formulas (1) and (1)' described above may be included within a range expressed by the following Formula (2), based on the training sample.

$$0.5 \leq \left| \frac{\int_0^{DOC} \sigma(x)dx}{\int_{DOC}^{\frac{T}{2}} \sigma(x)dx} \right| \leq 1.5 \quad (2)$$

where x is a depth from the surface of the chemically strengthened glass; T is the thickness of the chemically strengthened glass; DOC is a depth of a compressive stress layer; and σ is a function defined as Formula (1) or (1)' wherein the same formula is used for the numerator and the denominator.

The upper part and lower part in Formula (2) described above represent the absolute value of an area corresponding to stress values in a positive region (compressive stress values), and the absolute value of an area corresponding to stress values in a negative region (tensile stress values), respectively, with respect to a stress profile representing a relationship between the depth from the surface of the chemically strengthened glass and the stress value.

Figure 2:
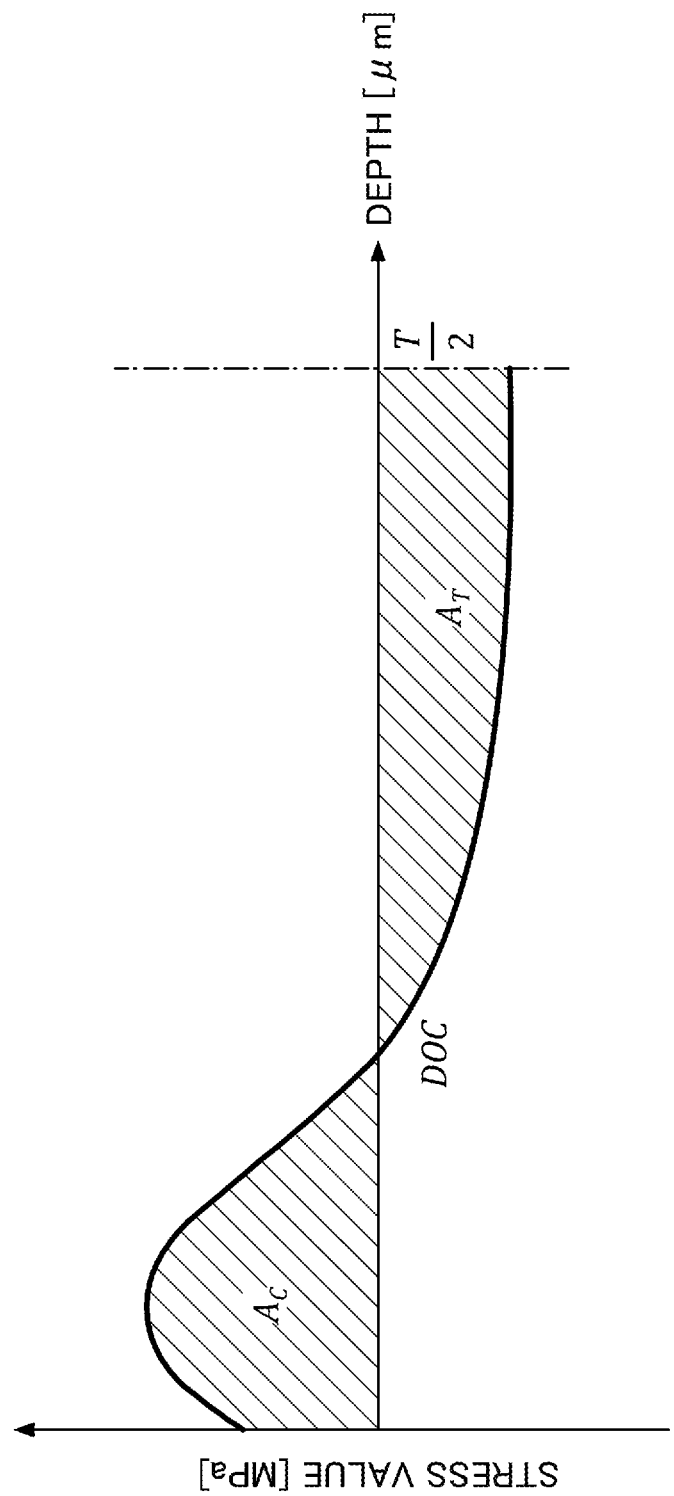
FIG. 2 is a diagram illustrating an example of a stress profile representing a relationship between the depth of a chemically strengthened glass and the stress value.

FIG. 2 is a diagram illustrating an example of a stress profile that represents a relationship between the depth of a chemically strengthened glass and the stress value. As illustrated in FIG. 2, an area $A_C$ corresponding to stress values in the positive region of the stress profile is an integrated value of the stress value from 0 μm to DOC in terms of the depth from the surface of a chemically strengthened glass, and is expressed by the absolute value of the integrated value in the upper part in Formula (2) described above. An area $A_T$ corresponding to stress values in the negative region of the stress profile is an integrated value of the stress value from the depth of DOC to the depth of T/2 in terms of the depth from the surface of the chemically strengthened glass, and is expressed by the absolute value of the integrated value in the lower part of Formula (2) described above. In other words, the upper part in Formula (2) described above is expressed as the following Formula (3), and the lower part of Formula (2) described above is expressed as the following Formula (4).

$$A_C = \int_0^{DOC} \sigma(x)dx \ldots \quad (3)$$

$$A_T = \int_{DOC}^{T/2} \sigma(x)dx \ldots \quad (4)$$

The fraction in Formula (2) described above can be expressed as $|A_C/A_T|$, and in the stress profile, can be expressed as an area ratio of the area $A_C$ corresponding to stress values in the positive region to the area $A_T$ corresponding to stress values in the negative region. In other words, it can be stated that $|A_C/A_T|$ represents the absolute value of the area ratio of the function. Formula (2) described above can be expressed as $0.5 \le |A_C/A_T| \le 1.5$, indicating that the area ratio is favorably within a range of $1.0 \pm 0.5$. In other words, it can be stated that Formula (2) described above defines a constraint condition of the area ratio of the function in the stress profile.

The ratio of a2 to a4 in Formula (1) described above may be fixed based on the training sample. In the case of using the temperature and the time being constant as the chemical strengthening conditions, there is a tendency that the same ratio is obtained with a2 and a4; therefore, by fixing the ratio of a2 to a4 to a constant value, the variation of stress values is likely to be suppressed.

As values to be inferred, the function unit 12 may infer stress values at depths of 0 μm, 10 μm, 20 μm, 30 μm, and 40 μm from the surface of the chemically strengthened glass, and gradients between the stress values at the respective depths.

Also, in the case where the surface roughness Ra of at least one of the surfaces of a chemically strengthened glass is less than or equal to 5 nm, the function unit 12 may use, as the input information, the stress values at three or more different depth positions located 20 μm or deeper from the surface of the chemically strengthened glass, to infer stress values at three or more different depth positions in a shallow region located 30 μm or shallower from the surface of the chemically strengthened glass, as the inference information. In the case where the surface roughness is less than or equal to 5 nm, measured values within a range of 20 μm to 50 μm obtained by SLP measurement have relatively high reliability.

The output unit 13 outputs, as the output information, stress values in a region located 50 μm or shallower from the surface of a chemically strengthened glass as the inference information inferred by the function unit 12.

Inference Method

Next, an inference method according to the present embodiment will be described. The inference method according to the present embodiment is executed using the inference device 1A according to the present embodiment. In the inference device 1A having the configuration as illustrated in FIG. 1, the inference method according to the present embodiment uses, as the input information, at least a temperature and a time used upon chemical strengthening, and stress values at three or more different depth positions 20 μm or deeper from the surface of a chemically strengthened glass obtained by chemically strengthening a glass with the temperature and the time, to infer a stress value in a region located 50 μm or shallower from the surface of a chemically strengthened glass as the inference information.

Figure 3:
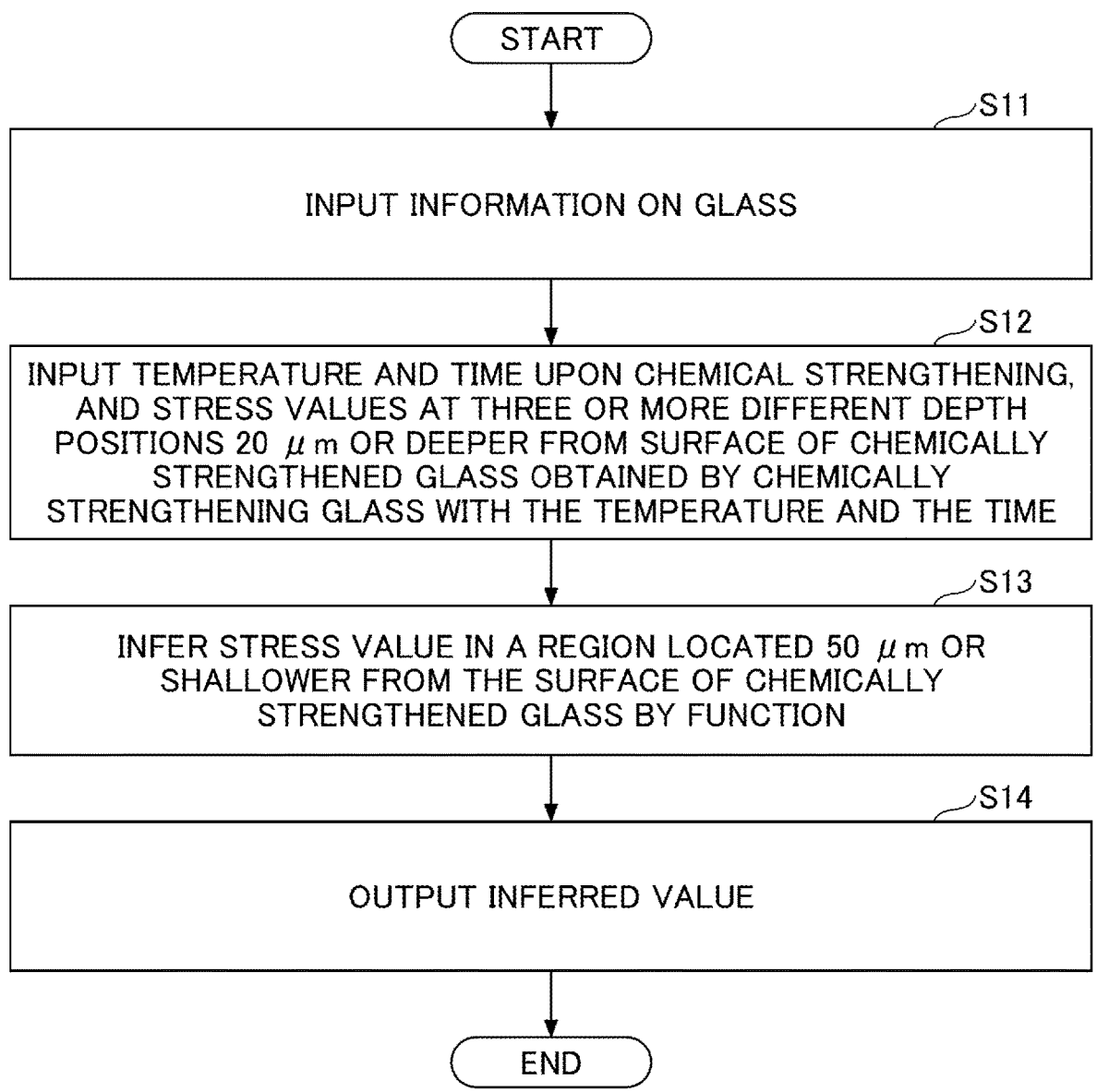
FIG. 3 is a flow chart describing the inference method according to the first embodiment in the present disclosure.

FIG. 3 is a flow chart describing the inference method according to the present embodiment. As illustrated in FIG. 3, the inference unit 10A uses the input unit 11 to receive as input glass information including the type, material, size, thickness, product name, and the like of a chemically strengthened glass to be inferred (glass information input step: Step S11).

Next, using the input unit 11, the inference unit 10A receives, as the input information, at least a temperature and a time used upon chemical strengthening the chemically strengthened glass to be inferred, and stress values at three or more different depth positions 20 μm or deeper from the surface of the chemically strengthened glass obtained by chemically strengthening a glass with the temperature and the time (stress value input step: Step S12).

Next, the inference unit 10A uses the function unit 12, with the input information input into the input unit 11, by the function, to infer a stress value in a region located 50 μm or shallower from the surface of the chemically strengthened glass as inference information (inference step: Step S13).

Next, the inference unit 10A uses the output unit 13 to output the stress value in the region located 50 μm or shallower from the surface of the chemically strengthened glass inferred as the inference information in the inference step (Step S13) (output step: Step S14).

Also, the inference unit 10A may use the function unit 12, to determine the degree of deviation from a stress value as the reference or target of the stress value in a region located 50 μm or shallower from the surface of a chemically strengthened glass inferred in the inference step (Step S13).

Hardware Configuration of Inference Device 1A

Figure 4:
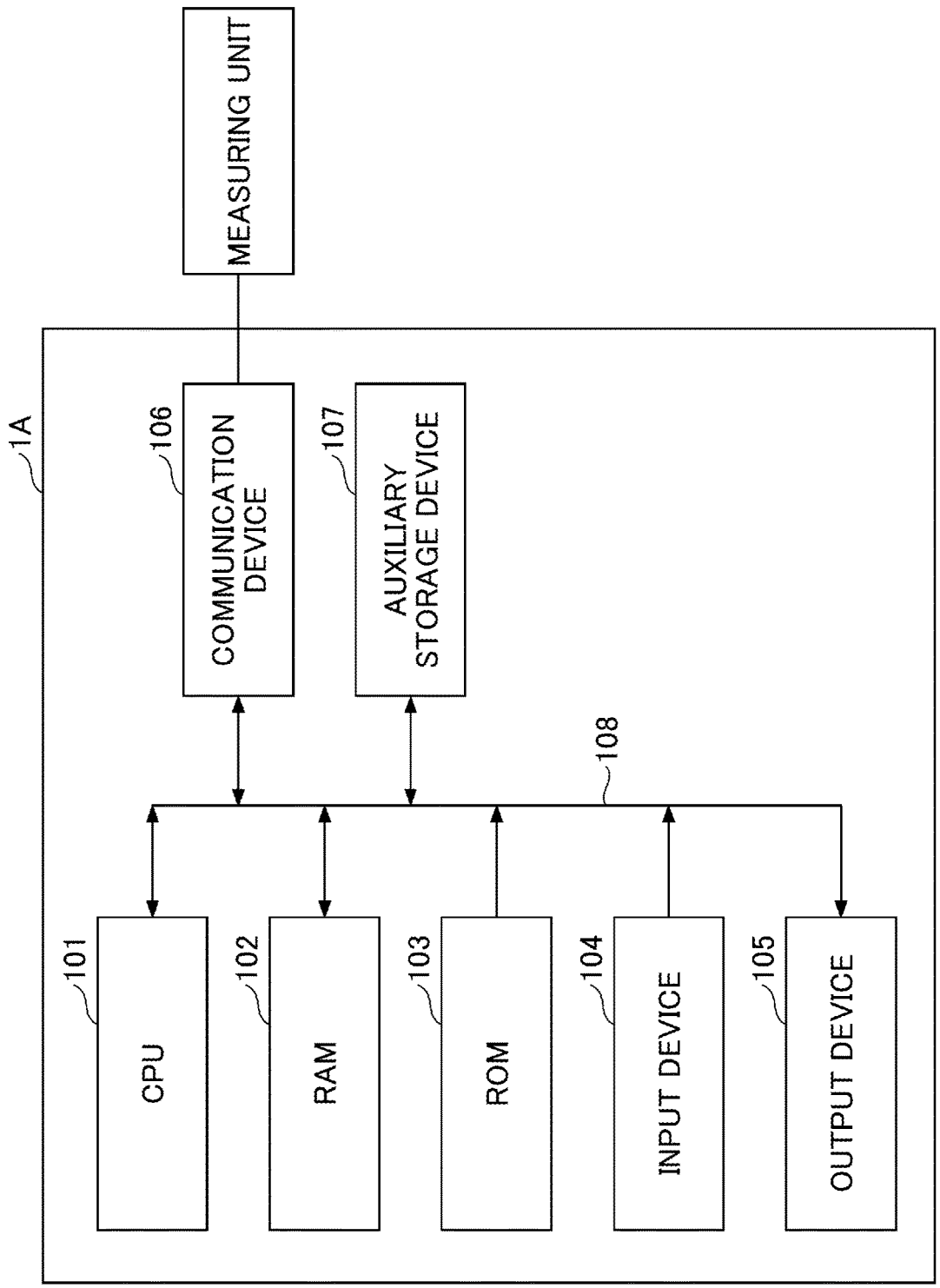
FIG. 4 is a block diagram illustrating a hardware configuration of an inference device.

Next, an example of a hardware configuration of the inference device 1A will be described. FIG. 4 is a block diagram illustrating the hardware configuration of the inference device 1A. As illustrated in FIG. 4, the inference device 1A is configured as an information processing device (computer), and may be configured as a computer system that physically includes a CPU (Central Processing Unit: Processor) 101 as an arithmetic/logic unit, a RAM (Random Access Memory) 102 and a ROM (Read-Only Memory) 103 as main memory devices, an input device 104 as an input device, an output device 105, a communication device 106, and an auxiliary storage device 107 such as a hard disk. These units are interconnected via a bus 108. Note that the output device 105 and the auxiliary storage device 107 may be provided externally.

The CPU 101 controls overall operations of the inference device 1A, to execute various types of information processing. The CPU 101 executes an inference program stored in the ROM 103 or the auxiliary storage device 107, to control display operations on a measurement recording screen and on an analysis screen.

The RAM 102 is used as a work area for the CPU 101, and may include a non-volatile RAM to store main control parameters and information.

The ROM 103 stores basic a basic input/output program and the like. The inference program may be stored in the ROM 103.

The input device 104 is constituted with input devices such as a keyboard, a mouse, operation buttons, a touch panel, and the like, to receive information input by the user as a command signal, and output the command signal to the CPU 101.

The output device 105 includes a monitor display, speakers, and the like. On the output device 105, input information on measurement, inference results, and the like are displayed. The output device 105 updates the screen and contents of notification in response to input/output operations via the input device 104 or the communication device 106.

The communication device 106 is a data transmission/reception device such as a network card, and functions as a communication interface to take in information from an external data recording server or the like, and output analysis information to other electronic devices such as a measuring unit to measure stress in a chemically strengthened glass.

The auxiliary storage device 107 is a storage device such as an SSD (Solid State Drive) and an HDD (Hard Disk Drive), to store, for example, various items of data, files, and the like required for operations of the inference device 1A.

Each of the functions of the inference device 1A illustrated in FIG. 3 is executed by the CPU 101, by loading predetermined computer software (including the inference program) into the main memory device such as the RAM 102 and the ROM 103, or the auxiliary storage device 107, and executing the inference program and the like stored in the RAM 102, the ROM 103, or the auxiliary storage device 107. By causing the input device 104, the output device 105, and the communication device 106 to operate, and by reading and writing data on the RAM 102, the ROM 103, and the auxiliary storage device 107, each of the functions of the inference device 1A is implemented. In other words, by having the inference program of the present embodiment run on the computer, the inference device 1A functions as the inference unit 10A or the like of the inference device 1A in FIG. 1. Also, in the present embodiment, the inference device 1A may be connected with a measuring unit or the like to measure stress of a chemically strengthened glass, through the communication device 106, and after receiving data required for measuring stress and storing the data in the RAM 102 temporarily, to take a stress value obtained by calculation on the CPU 101 as the input value.

The inference program according to the present embodiment uses a program that causes a computer to execute at least an inference step of inferring a stress value in a region located 50 µm or shallower from the surface of a chemically strengthened glass, by receiving as input at least a temperature and a time used upon chemical strengthening, and three or more depth positions 20 µm or deeper from the surface of a glass that has a thickness of 0.2 mm or more, and has been chemically strengthened with the temperature and the time.

The inference program according to the present embodiment is stored in a storage device provided in a computer, for example, the main memory device such as the RAM 102 and the ROM 103, the auxiliary storage device 107, or the like. Note that the inference program may be configured such that part of or all of the program is transmitted via a transmission medium, such as a communication line, and received and recorded (including installation) by the communication device 106 or the like provided in the computer. Also, the inference program according to the present embodiment may be configured to have part of or all of the inference program recorded (including installation) on a computer, from a state of having been stored in a portable storage medium such as a CD-ROM, DVD-ROM, flash memory, or the like.

As above, the inference method according to the present embodiment includes the inference step (Step S13), and in the inference step (Step S13), a stress value in a region located 50 µm or shallower from the surface of a chemically strengthened glass is inferred by using, as the input information, at least a temperature and a time used upon chemical strengthening, and stress values at three or more different depth positions located 20 µm or deeper from the surface of a chemically strengthened glass that has been chemically strengthened with the temperature and the time.

Figure 5:
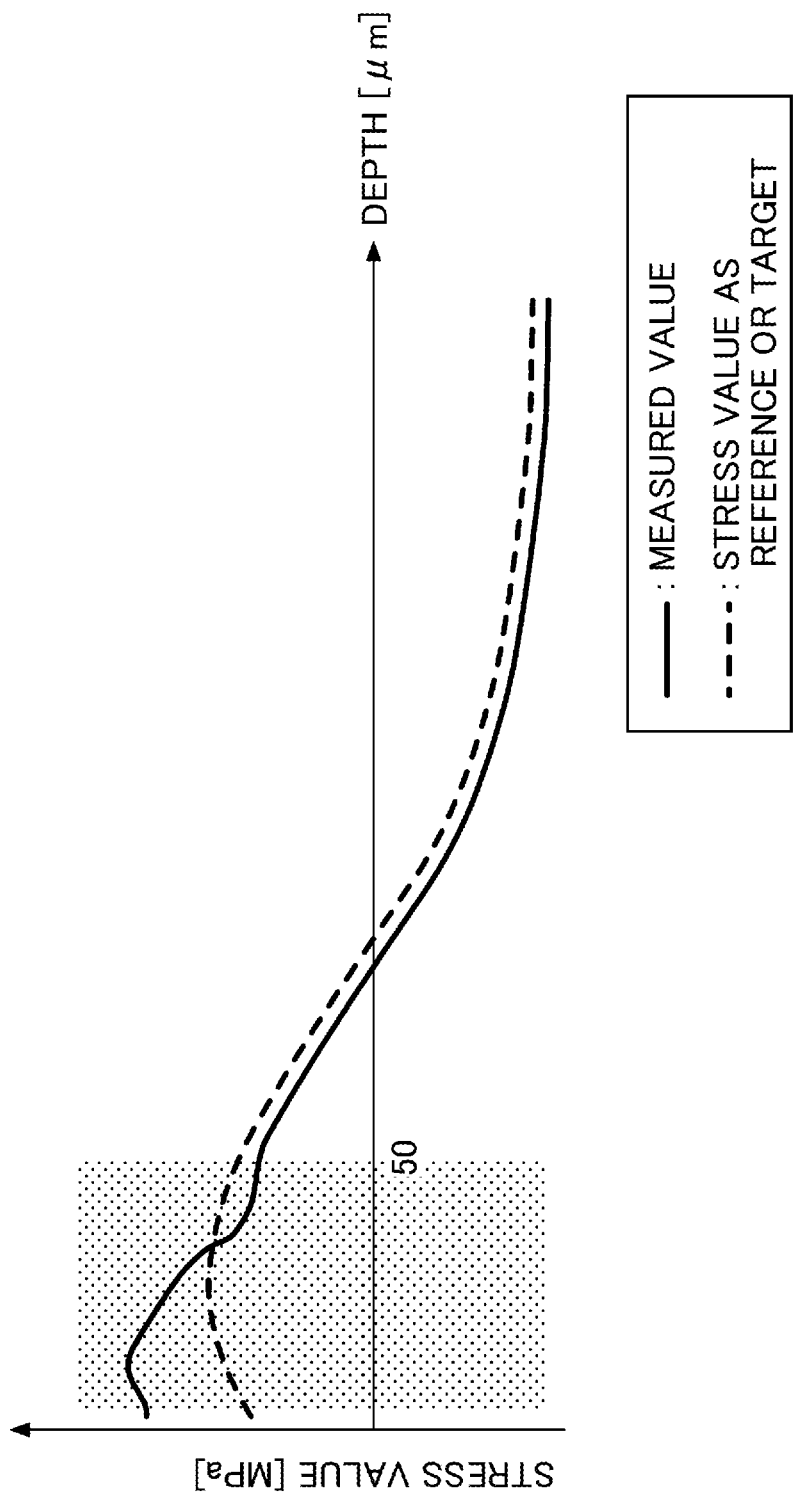
FIG. 5 is a diagram illustrating an example of a stress profile in the case of executing SLP measurement.

In general, in the case of using the scattered light photoelastic stress method as non-destructive inspection to execute SLP measurement, measured values of stresses at a depth of 50 µm or shallower from the surface of a chemically strengthened glass are prone to have large deviation from stress values as the reference or target obtained with destructive inspection using an EPMA or the like. FIG. 5 is a diagram illustrating an example of a stress profile representing a relationship between the depth from the surface of a chemically strengthened glass and the stress value in the case of executing SLP measurement. Note that in FIG. 5, a solid line represents measured values of the stress obtained from SLP measurement, and a dashed line represents measured values of the stress obtained from EPMA that indicate stress values as the reference or target. As illustrated in FIG. 5, in the SLP measurement, the measured values of the stress from the surface of the chemically strengthened glass to a depth of 30 µm or shallower is significantly deviated from the stress value as the reference or target, and beyond the depth of 30 µm, the measured value of the stress gradually approaches the stress value as the reference or target, and substantially the same value tends to be measured.

The inference method according to the present embodiment includes, as the input conditions in the inference step (Step S13), a temperature and a time used upon chemical strengthening, and stress values at three or more depth positions 20 µm or deeper from the surface of a glass chemically strengthened with the temperature and the time as the chemical strengthening conditions. The stresses at positions 20 µm or deeper from the surface of the chemically strengthened glass are almost equivalent to the stress values as the reference or target, and are highly reliable values. From these highly reliable values and the temperature and the time used upon chemical strengthening, stress values in a shallow region located 50 µm or shallower from the surface of the chemically strengthened glass can be inferred highly accurately, whereas SLP measurement would result in values of low reliability particularly in such a shallow region.

By using the inference method according to the present embodiment, a stress value can be inferred in a shallow region located 50 µm or shallower from the surface of a chemically strengthened glass, that is almost equivalent to that obtained with destructive inspection; therefore, a stress value in a shallow region located 50 µm or shallower from the surface of a chemically strengthened glass of any type can be inferred highly accurately regardless of the type of glass.

The inference method according to the present embodiment is capable of inferring a stress value in a shallow region located 50 µm or shallower from the surface of a chemically strengthened glass highly accurately; therefore, development for finding proper chemical strengthening conditions, and quality control of manufactured glass can be executed appropriately.

The inference method according to the present embodiment is capable of inferring stress values at several points (e.g., nine points) in a shallow region located 50 µm or shallower from the surface of a chemically strengthened glass. In this case, the squared residual of an inferred value of the stress value inferred at each of the several points may be calculated, to evaluate the inference accuracy from the total value of the calculated squared residuals (sum of squared residuals) of the inferred values. In this case, a smaller sum of squared residuals can be evaluated as a better inference result.

Note that in the case of executing chemical strengthening multiple times, for example, during the first chemical strengthening, $NaNO_3$ salt may be used as the molten salt, to replace Li ions in the glass with Na ions in the molten salt, so as to inject Na ions into the glass. Then, during the second chemical strengthening and thereafter, by using mixed molten salt of $KNO_3$ and $LiNO_3$ salt to replace mainly Na ions in the glass with mainly K ions in the mixed molten salt, so as to inject K ions into the glass. At this time, due to the difference in diffusivity between Na ions and K ions, Na ions penetrate into the deep inside of the glass, whereas K ions penetrate into the glass only by a few μm (around 10 μm at most). In other words, K ions do not reach a depth of 20 μm or deeper in which accuracy of SLP measurement is good. Therefore, in the case of executing chemical strengthening multiple times, only the stress due to the concentration gradient of Na ions contained in the chemically strengthened glass can be measured by SLP measurement; therefore, the inference method according to the present embodiment measures only the stress due to the concentration gradient of Na ions contained in the chemically strengthened glass.

The inference method according to the present embodiment can infer a stress value in a region located 50 μm or shallower from the surface of a chemically strengthened glass in the inference step (Step S13), by determining values a1 to a5 in Formula (1) described above in advance before executing inference using a result of measurement of one or more training samples in which a glass is chemically strengthened under sample conditions of inference in which each of the temperature (unit: ° C.), time (unit: h), and salt concentration (unit: %) upon immersing the glass, is set to a point in each of the ranges of ±30° C., ±1 h, and ±10%, as the sample conditions for chemical strengthening. Although a1 to a5 can be set to minimize the sum of squared residuals based on the training sample, constraints may be set to a2/a4 and a5. Based on the chemical strengthening conditions actually applied, the inference method according to the present embodiment can increase the inference accuracy of stress values in a shallow region located 50 μm or shallower from the surface of a chemically strengthened glass in the inference step (Step S13).

In the inference step (Step S13), the inference method according to the present embodiment can apply stress values at three or more different depth positions, to a function having three terms or more, to infer a stress values in a shallow region located 50 μm or shallower from the surface of a chemically strengthened glass. Therefore, according to the inference method according to the present embodiment, by fitting the stress values in the deep part of the chemically strengthened glass to the function having three terms or more, inference of stress values in a shallow region located 50 μm or shallower from the surface of a chemically strengthened glass can be executed easily and securely.

The inference method according to the present embodiment can use, in the inference step (Step S13), at least one of a complementary error function and an error function, as two or more terms of the function having three terms or more. Accordingly, the inference method according to the present embodiment can obtain better fitting with the complementary error function and the error function, and thereby, can increase the inference accuracy of the stress values in a shallow region located 50 μm or shallower from the surface of a chemically strengthened glass.

The inference method according to the present embodiment may use Formula (1) described above in the inference step (Step S13) as the function having three terms or more. As Formula (1) is a simple formula, Formula (1) may be used simply as the function having three terms or more. Therefore, the inference method according to the present embodiment can infer stress values in a shallow region located 50 μm or shallower from the surface of a chemically strengthened glass with high accuracy, even using Formula (1) described above as the function.

The inference method according to the present embodiment may have a5 in Formula (1) described above included within the range of Formula (2) described above in the inference step (Step S13), based on the training sample described above. The fraction in Formula (2) described above can be expressed as an area ratio of the area $A_C$ corresponding to stress values in the positive region to the area $A_T$ corresponding to stress values in the negative region, in a stress profile representing a relationship between the depth from the surface of the chemically strengthened glass and the stress value. By having the area ratio included within the range of 1.0±0.5, the curve for the stress profile can be simplified. Therefore, the inference method according to the present embodiment can suppress the variation of stress values in a shallow region located 50 μm or shallower from the surface of a chemically strengthened glass, and can increase the measurement accuracy of the stress values.

The inference method according to the present embodiment can fix the ratio of a2 to a4 in Formula (1) described above in the inference step (Step S13), based on the training sample. The user often sets the temperature and the time to constant values as the chemical strengthening conditions, and in general, continuously uses the molten salt used for chemical strengthening; therefore, the salt concentration of the molten salt decreases. In the case of using the temperature and the time being constant as the chemical strengthening conditions, there is a tendency that the same ratio is obtained with a2 and a4 in Formula (1) described above. Therefore, by fixing the ratio of a2 to a4, the variation of stress values can be suppressed more easily, and the stress profile is more likely to form a smooth curve. Therefore, fixing the ratio of a2 to a4 in Formula (1) described above based on the training sample allows the inference method according to the present embodiment to increase more easily the inference accuracy of stress values in a shallow region located 50 μm or shallower from the surface of a chemically strengthened glass.

In the inference step (Step S13), as values to be inferred, the inference method according to the present embodiment can infer stress values at depths of 0 μm, 10 μm, 20 μm, 30 μm, and 40 μm from the surface of a chemically strengthened glass, and gradients between the stress values at the respective depths. In this way, the inference device 1A can properly infer stress values at any depths within a range of 50 μm or shallower from the surface of the chemically strengthened glass, and the gradient of the stress values.

The inference method according to the present embodiment can output in the output step (Step S14) the inference result obtained in the inference step (Step S13). Accordingly, the inference method according to the present embodiment can output the inference result by the output device with a display, sound, and the like, and thereby, can securely have the user recognize the inference result.

Thanks to having the properties as described above, the inference method according to the present embodiment is suitably used for finding proper chemical strengthening conditions, and for executing quality control of manufactured glass appropriately. Therefore, the inference method according to the present embodiment is suitably used as a quality control method of glass.

Also, by using the inference method according to the present embodiment, quality controlled glass can be obtained, and hence, glass assured to have high quality can be provided. By having the inference method according to the present embodiment included in a method of manufacturing chemically strengthened glass, and using the method in process management and the like of the glass, the chemically strengthened glass assured to have high quality can be manufactured.

The method of manufacturing chemically strengthened glass is a method of manufacturing chemically strengthened glass including one or more chemical strengthening steps, wherein the glass is chemically strengthened to obtain the chemically strengthened glass, and may include the following steps.

A step of generating stress at positions located deeper than 20 μm from the surface of the glass by executing chemical strengthening at least once (chemical strengthening step); a step of determining SLP measured values by executing SLP measurement of the stress of the glass (SLP measurement step); a step of applying the inference method according to the present embodiment to the SLP measured values, to infer stress values at 50 μm or shallower from the surface of the glass, so as to estimate a stress profile of a region located 50 μm or shallower from the surface of the glass (estimation step); and a step of adjusting by executing, based on the stress profile of the region located 50 μm or shallower from the surface of the glass that has been estimated by the inferred stress values, at least one of (1) adjustment of the temperature or time in at least one chemical strengthening step, and (2) adjustment of the concentration of salt in at least one chemical strengthening step (adjusting step).

By including the steps described above, and using the inference method according to the present embodiment to estimate a stress profile of a region located 50 μm or shallower from the surface of the glass, the method of manufacturing chemically strengthened glass can maintain the stress near the surface of the glass highly accurately, and can be suitably used for the process management of the chemically strengthened glass, and hence, can manufacture the chemically strengthened glass assured to have high quality.

In the case of executing chemical strengthening on a glass at least once, SLP measurement may be executed after the chemical strengthening has been completed entirely, or at an intermediate stage. For example, in the case of executing chemical strengthening on a glass multiple times, SLP measurement may be executed at any stage after Li ions in the glass and Na ions in the molten salt have been ion-exchanged, and Na ions have been injected into the glass. Also, in the case of executing chemical strengthening on a glass multiple times, SLP measurement may be executed after a chemical strengthening step has been completed to exchange Li ions in the glass with Na ions in the molten salt to inject Na ions, and before the next chemical strengthening step. In this case, without being affected by the ion exchange at a later stage, a stress profile based on Na ions injected by chemical strengthening steps up to the latest can be estimated, which is favorable.

Also, in the case of executing chemical strengthening on a glass at least once, the chemical strengthening step of executing chemical strengthening while adjusting the chemical strengthening conditions based on an estimated stress profile shallower than 50 μm, may be executed while adjusting the chemical strengthening conditions of chemical strengthening steps to be executed thereafter. In the case of executing chemical strengthening on a glass multiple times, steps that are yet to be executed may be adjusted in advance. In the case of adjusting a step that has been already executed, manufacturing of a chemically strengthened glass for the next time can be started under suitable conditions, and thereby, manufacturing of high quality glass can be maintained. In the case of adjusting a step that is yet to be executed, a final stress profile of the glass measured by SLP measurement can be adjusted, and thereby, the quality can be maintained.

Also, in the case of executing chemical strengthening multiple times, a chemical strengthening step of executing chemical strengthening while adjusting the chemical strengthening conditions based on an estimate stress profile shallower than 50 μm, may inject primarily Na ions into the glass, or may have Na ions in the glass and K ions in the molten salt ion-exchanged to inject K ions into the glass.

Second Embodiment

Inference Device

An inference device that executes an inference method according to a second embodiment in the present disclosure will be described. The inference method according to the present embodiment uses a model instead of a function used in the inference step (Step S13) of the inference method according to the first embodiment described above.

Figure 6:
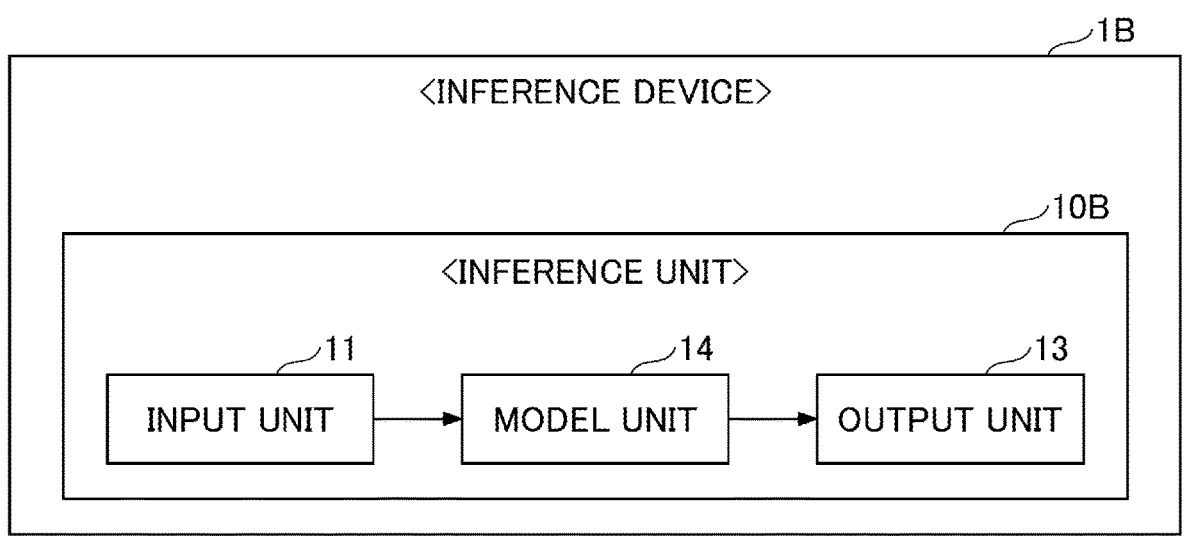
FIG. 6 is a block diagram illustrating a general configuration of an inference device that executes an inference method according to a second embodiment in the present disclosure.

FIG. 6 is a block diagram illustrating a general configuration of an inference device that executes an inference method according to the present embodiment. As illustrated in FIG. 6, an inference device 1B that executes an inference method according to the present embodiment includes an inference unit 10B, and the inference unit 10B is provided with a model unit 14 instead of the function unit 12 of the inference device 1A to execute the inference method according to the first embodiment described above.

The inference device 1B that executes the inference method according to the present embodiment infers values including a stress value in a region located 50 μm or shallower from the surface of a chemically strengthened glass highly accurately, by receiving as input into the inference unit 10B at least a temperature and a time used upon chemical strengthening, and stress values at three or more different depth positions 20 μm or deeper from the surface of a chemically strengthened glass that has been obtained by chemically strengthening a glass having a thickness of 0.2 mm or greater with the temperature and the time.

In the present embodiment, except for the configuration of the model unit 14, the overall configuration is substantially the same as in the inference device 1A that executes the inference method according to the first embodiment described above; therefore, only the configuration of the model unit 14 will be described.

The model unit 14 uses input information received as input by the input unit 11 in a model, to infer a stress value in a region located 50 μm or shallower from the surface of a chemically strengthened glass as inference information.

It is favorable for the model to use algorithms of supervised learning and neural networks from among techniques of machine learning. As the supervised learning, for example, lasso regression, linear regression, logistic regression, random forest, boosting, support vector machine (SVM), and the like may be enumerated. As the neural network, deep learning may be used in which neural networks are formed to have multiple layers, that is more than three layers. As the types of neural networks, for example, convolutional neural networks (CNN)), recurrent (recursive) neural networks (RNN), and general regression neural networks, and the like can be used.

The model unit 14 may generate a learning model. An example of a generation method of the learning model will be described. The learning model can be generated as follows.

(Generation of Learning Model)

First, at least, a glass is chemically strengthened with a temperature and a time used upon chemical strengthening. The temperature, time, and the like at this time are registered as the chemical strengthening conditions (first registration).

As will be described later, an optimum model is selected based on the type of glass and the chemical strengthening conditions registered in the first registration. Upon selecting a model, by using a data table that represents a relationship between types of glass and strengthening conditions, and suitable models, and based on a type l of glass (l is an integer greater than or equal to one) and strengthening conditions m (m is an integer greater than or equal to one), an optimum model n (n is an integer greater than or equal to one) may be selected in advance. Note that upon defining the type of glass, factors of material, size, thickness, product name, and the like of the glass may be considered. As the data table, for example, a data table or the like that is generated to have the type of glass and the strengthening conditions as the explanatory variables, and the optimum model as the response variable, may be used. For example, in the case where the type of glass and the type of strengthening conditions are Glass condition 1 and Strengthening condition 1, Model 1 is used; in the case where the type of glass and the type of strengthening conditions are Glass condition 1 and Strengthening condition 2, Model 2 is used; and in the case where the type of glass and the type of strengthening conditions are Glass condition 2 and Strengthening condition 1, Model 3 is used.

Next, stress values of the chemically strengthened glass are measured by SLP measurement or the like using a first stress measuring device used for quality control in mass production. At this time, obtained stress value data at positions 20 μm or deeper from the surface of the chemically strengthened glass are registered as the explanatory variables (second registration).

Here, stress value data obtained at positions 50 μm or deeper from the surface of the chemically strengthened glass are used as evaluation values rather than as predicted values.

Next, stress values in a shallow region located 50 μm or shallower from the surface of the chemically strengthened glass are measured using a second stress measuring device to execute destructive inspection. At this time, from among the measured stress values, stress values in a shallow region located 50 μm or shallower from the surface of the chemically strengthened glass are registered as the response variables.

Note that the second stress measuring device is a device that is difficult to use in mass production, and multiple devices may be used. As the reasons of the difficulty, high cost, large size, long time required for evaluation, need for evaluation skills, type of being destructive, and the like may be enumerated.

Figure 7:
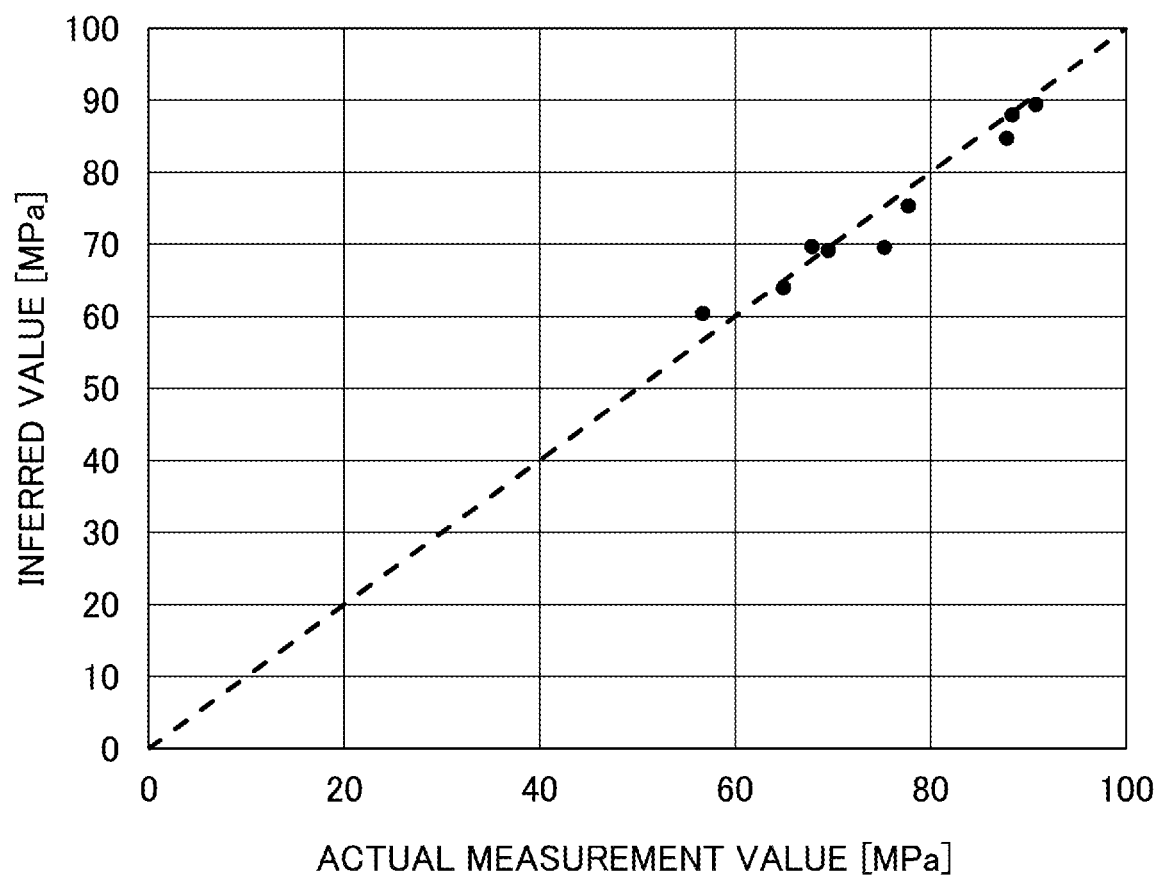
FIG. 7 is a diagram illustrating an example of a learning model to be designed.

Next, using the explanatory variables obtained with the first registration and the second registration described above, and the response variables obtained by the second stress measuring device, multiple models on which inference can be executed are designed, and an optimum model is selected. At this time, from the viewpoint of increasing the inference performance of the response variables by the models, and the like, it is favorable to build models so as to have the number of the explanatory variables as few as possible. As the models to be designed, for example, a random forest or the like may be designed that has learned a correspondence relationship between the explanatory variables obtained from the first registration and the second registration, and the response variables as illustrated in FIG. 7.

(Inference of Response Variables)

Next, the response variables are inferred by selecting an optimum model from among the multiple designed models, and inputting the chemical strengthening conditions required for inference into the first stress evaluation device as the explanatory variables. Accordingly, stress values in a shallow region located 50 μm or shallower from the surface of a chemically strengthened glass are inferred.

The model unit 14 may select a model, for example, for each of the glass materials, types, manufacturing places, and manufacturing steps, to infer the response variables.

The model unit 14 can infer stress values at 50 μm or shallower, based on the training sample, and by using the stress values at three or more different depth positions.

The number of stress values at three or more different depth positions is favorably three to 20, more favorably five to 18, and furthermore favorably seven to 15.

Figure 8:
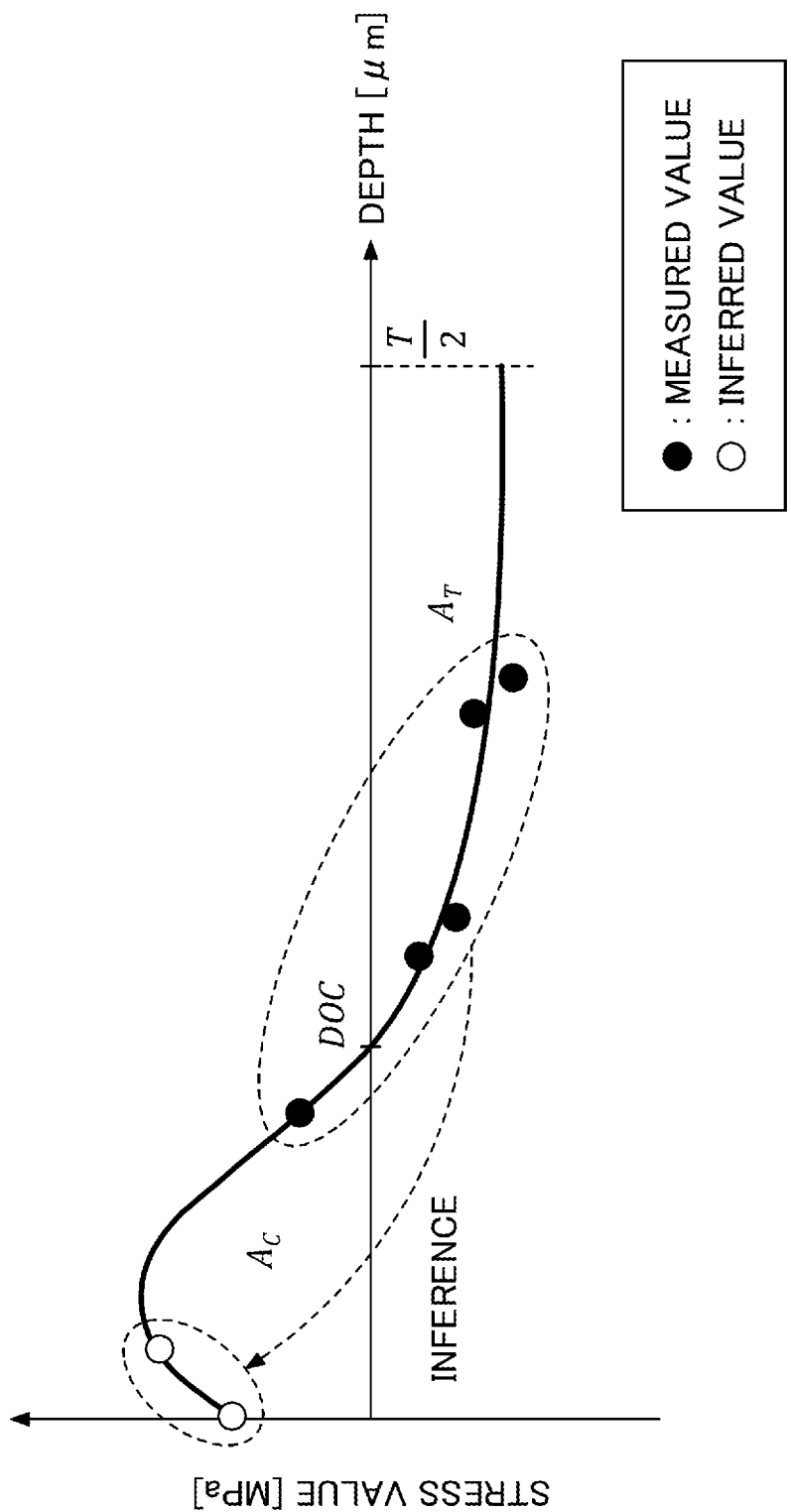
FIG. 8 is a diagram illustrating an example of stress values in the depth direction of a chemically strengthened glass.

The stress values in a shallow region located 50 μm or shallower from the surface of a chemically strengthened glass may be inferred such that the absolute value of the area ratio of the region where the inferred stress value is positive to the region where the inferred stress value is negative, falls within a range of 0.5 to 1.5. FIG. 8 is a diagram illustrating an example of a relationship between the depth from the surface of a chemically strengthened glass and the stress value. As illustrated in FIG. 8, the region where the stress value is positive corresponds to the area $A_C$ and the region where the stress value is negative corresponds to the area $A_T$, and the absolute value of the area ratio of the area $A_C$ to the area $A_T$ (area $A_C$/area $A_T$) is within 0.5 to 1.5.

Inference Method

Next, by using the inference device 1B according to the present embodiment, the inference method according to the present embodiment will be described. In the inference device 1B having the configuration as illustrated in FIG. 6, the inference method according to the present embodiment uses, as the input information, at least a temperature and a time used upon chemical strengthening, and stress values at three or more different depth positions 20 μm or deeper from the surface of a chemically strengthened glass obtained by chemically strengthening a glass with the temperature and the time, to infer a stress value in a region located 50 μm or shallower from the surface of a chemically strengthened glass as inference information.

Figure 9:
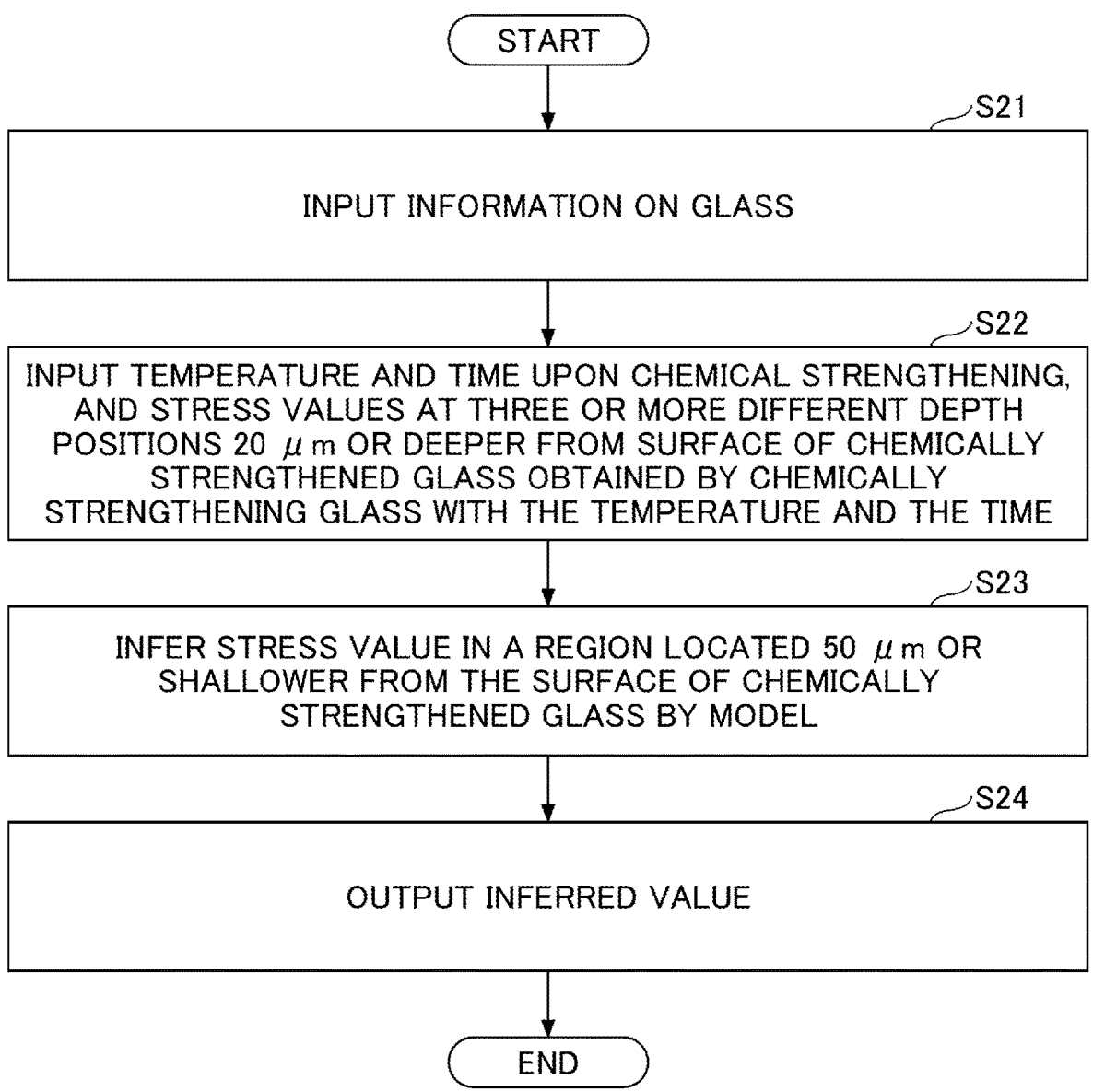
FIG. 9 is a flow chart describing the inference method according to the second embodiment in the present disclosure.

FIG. 9 is a flow chart describing the inference method according to the present embodiment. As illustrated in FIG. 9, the inference unit 10B illustrated in FIG. 6 uses the input unit 11 to receive as input glass information including the type, material, size, thickness, product name, and the like of a chemically strengthened glass (glass information input step: Step S21).

Next, using the input unit 11, the inference unit 10B receives, as the input information, at least a temperature and a time used upon chemical strengthening, and stress values at three or more different depth positions 20 μm or deeper from the surface of the chemically strengthened glass obtained by chemically strengthening a glass with the temperature and the time (stress value input step: Step S22).

Next, the inference unit 10B uses the model unit 14, with the input information input into the input unit 11, by the model, to infer a stress value in a region located 50 μm or shallower from the surface of the chemically strengthened glass as inference information (inference step: Step S23).

Next, the inference unit 10B uses the output unit 13 to output the stress value in the region located 50 μm or shallower from the surface of the chemically strengthened glass inferred as the inference information in the inference step (Step S23) (output step: Step S24).

Also, the inference unit 10B may use the model unit 14, to determine the degree of deviation from a stress value as the reference or target of the stress value in a region located 50 μm or shallower from the surface of the chemically strengthened glass inferred in the inference step (Step S23).

Hardware Configuration of Inference Device 1B

Next, an example of a hardware configuration of the inference device 1B will be described. Details of the hardware configuration of the inference device 1B are omitted because the configuration is substantially the same as the hardware configuration of the inference device 1A except that the function unit 12 is changed to the model unit 14.

The inference method according to the present embodiment includes the inference step (Step S23), and in the inference step (Step S23), based on the training sample, and by using stress values at three or more different depth positions located 20 μm or deeper from the surface of a chemically strengthened glass obtained from a glass chemically strengthened with the temperature and the time, by the model, can infer stress values in a region located 50 μm or shallower from the surface of a chemically strengthened glass. As described above, the stresses at positions 20 μm or deeper from the surface of the chemically strengthened glass are almost equivalent to the stress values as the reference or target, and are highly reliable values. As in the inference method according to the first embodiment described above, even using a model to infer stress values, the inference method according to the present embodiment can infer highly accurately stress values in a shallow region located 50 μm or shallower from the surface of a chemically strengthened glass, from the highly reliable value and the temperature and the time used upon chemical strengthening, whereas SLP measurement would result in values of low reliability particularly in such a shallow region.

As in the inference method according to the first embodiment, by using the inference method according to the present embodiment, a stress value can be inferred in a shallow region located 50 μm or shallower from the surface of a chemically strengthened glass, that is almost equivalent to that obtained with destructive inspection; therefore, a stress value in a shallow region located 50 μm or shallower from the surface of a chemically strengthened glass of any type can be inferred highly accurately regardless of the type of glass.

As in the inference method according to the first embodiment, the inference method according to the present embodiment is capable of inferring a stress value in a shallow region located 50 μm or shallower from the surface of a chemically strengthened glass highly accurately; therefore, development for finding proper chemical strengthening conditions, and quality control of manufactured glass can be executed appropriately.

The inference method according to the present embodiment can set the number of three or more different depth positions located 20 μm or deeper from the surface of a glass chemically strengthened with the temperature and the time, to three to 20. The machine learning here may not be able to infer stress values in a shallow region located 50 μm or shallower from the surface of a chemically strengthened glass with good accuracy if the number of input points is too many. According to the inference method according to the present embodiment, stress values in a shallow region located 50 μm or shallower from the surface of a chemically strengthened glass can be inferred stably with good accuracy.

The inference method according to the present embodiment can infer stress values in a region located 50 μm or shallower from the surface of a chemically strengthened glass, such that the absolute value of the area ratio of the region where the inferred stress value is positive and the region where the inferred stress value is negative in a stress profile representing a relationship between the depth from the surface of the chemically strengthened glass and the stress value, falls within a range of 0.5 to 1.5. By having the area ratio included within a range of 1.0±0.5, the curve of the stress profile can be suppressed from becoming abnormal. Therefore, the inference method according to the present embodiment can suppress the variation of stress values in a shallow region located 50 μm or shallower from the surface of a chemically strengthened glass, to increase the measurement accuracy of the stress values.

Also, as in the inference method according to the first embodiment described above, by using the inference method according to the present embodiment, quality controlled glass can be obtained, and hence, glass assured to have high quality can be provided. By having the inference method according to the present embodiment included in a method of manufacturing chemically strengthened glass, the chemically strengthened glass assured to have high quality can be manufactured. The method of manufacturing chemically strengthened glass can be executed in substantially the same way as in the first embodiment described above, to manufacture a chemically strengthened glass assured to have high quality.

APPLICATION EXAMPLES

In the following, although the embodiments will be described in more detail by way of examples, the embodiments are not limited by these examples. Example 1 and Example 2 are application examples.

Example 1

Production of Chemically Strengthened Glass Substrate

A glass substrate was prepared. The glass substrate contained, by oxide basis, 63.6 wt % of $SiO_2$, 19.8 wt % of $Al_2O_3$, 0.1 wt % of MgO, 0.1 wt % of CaO, 4.3 wt % of $Na_2O$, 1.8 wt % of $K_2O$, 0.6 wt % of $ZrO_2$, 5.0 wt % of $Li_2O$, 4.5 wt % of $Y_2O_3$, and 0.2 wt % of $TiO_2$. The size of the glass substrate was specified such that the principal surface was a rectangle of 50 mm×50 mm, and the thickness was 0.7 mm.

(Chemical Strengthening Process)

A chemical strengthening process was applied to the prepared glass substrate according to the following steps. First, the glass substrate was heated up to 420° C. and immersed in a bathtub containing molten salt in which sodium nitrate salt was dissolved for 100 minutes, and then, the glass substrate was lifted up from the molten salt. Next, the glass substrate was heated up to 400° C., and immersed in a bathtub containing mixed molten salt in which potassium nitrate salt and lithium nitrate salt (99.4 wt % of KNO₃ and 0.6 wt % of LiNO₃) were dissolved for 100 minutes, and then, the glass substrate was lifted up from the mixed molten salt and slowly annealed down to room temperature, to obtain a chemically strengthened glass substrate.

Note that chemically strengthened glass substrates under Conditions 1-1 to 1-9 (see Tables 1 and 2) are basically the glass substrate described above strengthened under the chemical strengthening conditions described, although the respective stress profiles varied depending on minute variation in the composition of the glass substrate, the placed position of the glass substrate in the bathtub, the fluctuation in impurity concentration in the molten salt or mixed molten salt (degradation by repetition), and the like.

Measurement of Stress

Stress values of each of the obtained chemically strengthened glass substrates under Conditions 1-1 to 1-9 were measured with two inspection methods of non-destructive inspection and destructive inspection.

In the non-destructive inspection method, SLP measurement was executed by using a scattered light photoelastic stress meter. The phase difference between an s-polarized component and a p-polarized component observed from scattered light of laser irradiated on each of the chemically strengthened glass substrates under Conditions 1-1 to 1-9 was measured, and a stress value in the thickness direction of each of the chemically strengthened glass substrates under Conditions 1-1 to 1-9 was calculated, to generate a stress profile.

Figure 10:
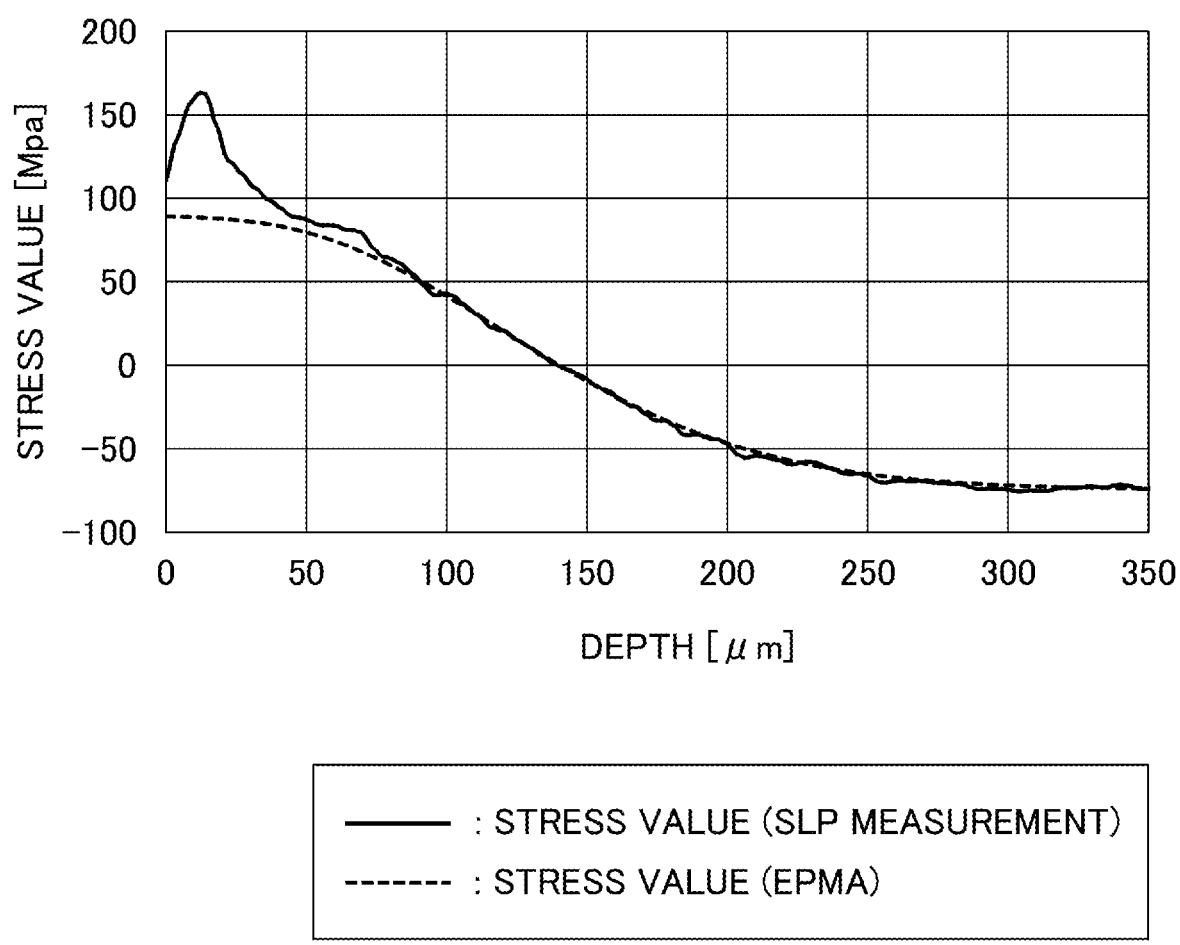
FIG. 10 is a diagram illustrating a result of SLP measurement and a stress profile obtained by an EPMA for a chemically strengthened glass substrate under Condition 1-1.

In the destructive inspection method, measurement was executed by using an electronic probe microanalyzer (EPMA). Each of the chemically strengthened glass substrates under Conditions 1-1 to 1-9 was cut apart so that the cross section including positions for measurement became visible, and by the EPMA, the Na concentration of each of the chemically strengthened glass substrates under Conditions 1-1 to 1-9 was estimated at each of the positions in the depth direction of each of the chemically strengthened glass substrates under Conditions 1-1 to 1-9, to generate the stress profile from the concentration gradient of Na. The stress values obtained by the destruction were actually measured values of the stress at the positions of each of the chemically strengthened glass substrates under Conditions 1-1 to 1-9 after having been cut apart along these positions, and hence, were treated as stress values as the reference or target at the positions of the chemically strengthened glass substrates under Conditions 1-1 to 1-9. A result of a stress profile obtained by the SLP measurement and the EPMA at the position of the chemically strengthened glass substrate under Condition 1-1 is illustrated in FIG. 10.

Note that in the present example, chemical strengthening was executed twice and K was contained near the topmost layer (several µm deep) of the chemically strengthened glass substrate; therefore, there might be a case in which a stress caused by the concentration gradient of K was included in the stress profile. In the present example, in order to investigate the stress caused by the concentration gradient of Na, a stress caused by the concentration gradient of K found near the topmost layer (several µm deep) was excluded.

Inference of CS20

(Inference by Function)

Among the measurements of stresses described above, by using the stress values obtained by the SLP measurement at depths of 50 µm to 350 µm (center of thickness) from the position of the surface of each of the chemically strengthened glass substrates under Conditions 1-1 to 1-9 in the function shown in the following Formula (1), inferred values of the stress values (CS20) at a position 20-µm deep from the position of the surface of each of the chemically strengthened glass substrates under Conditions 1-1 to 1-9 were calculated. At that time, the area ratio of the following Formula (2), a2/a4 ratio, or both the area ratio the following Formula (2) and a2/a4 ratio were fixed to give a constraint condition, to calculate each inferred value of CS20. The area ratio of Formula (2) described below was fixed to 0.68 and the a2/a4 ratio was fixed to 1.57.

$$\sigma(x) = a_1 \cdot \text{erfc}(a_2 \cdot x) + a_3 \cdot \text{erfc}(a_4 \cdot x) a_5 \ldots \quad (1)$$

where σ is a stress value in the depth direction from the surface of the chemically strengthened glass; x is a depth from the surface of the chemically strengthened glass; and a1 to a5 are parameters used for prediction.

$$0.5 \leq \left| \frac{\int_0^{DOC} \sigma(x)dx}{\int_{DOC}^{\frac{T}{2}} \sigma(x)dx} \right| \leq 1.5 \quad (2)$$

where x is a depth from the surface of the chemically strengthened glass; T is the thickness of the chemically strengthened glass; DOC is a depth of the compressive stress layer; and σ is a function defined as Formula (1) where the same formula is used for the numerator and denominator.

(Inference by Model)

The temperature; the time; the salt concentration of molten salt containing sodium nitrate or potassium nitrate contained in a chemical process liquid into which the glass was immersed during chemical strengthening; the type of the glass substrate; the stress values at depths of 50 µm and 90 µm from the surface of the glass substrate; the depth at which the stress value becomes zero (DOC); and the stress value (CT) at the center of the glass substrate, were taken as the explanatory variables, and by using a model on which learning was executed in advance using a random forest, CS20 was inferred.

Table 1 shows the inferred values of CS20 by the function or model. Also, FIG. 11 illustrates a relationship between the actual measurement values of CS20 obtained with SLP measurement, and the inferred values of CS20 according to the function or model. Note that Table 1 also shows the actual measurement values of CS20 of the chemically strengthened glass substrates under Conditions 1-1 to 1-9 measured by using the EPMA as the destructive inspection method, and the measured values of CS20 (SLP measured values of CS20) of the chemically strengthened glass substrates under Conditions 1-1 to 1-9 measured with SLP measurement.

Figure 12:
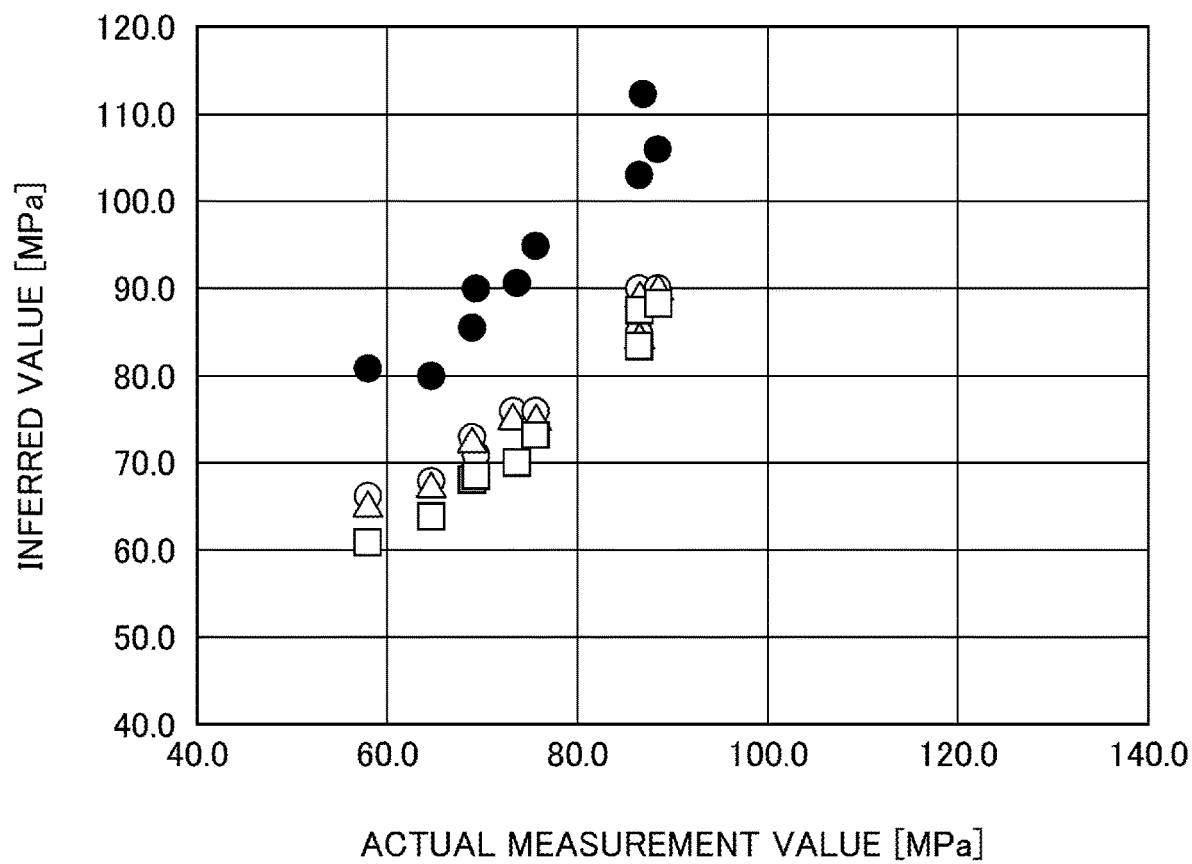
FIG. 12 is a diagram illustrating a relationship between actual measurement values of CS30 obtained with SLP measurement, and inferred values of CS30 according to a function or model.

Also, by using the function or model, in substantially the same way as described above, the stress value (CS30) at a position 30-µm deep from the position of the surface of each of the chemically strengthened glass substrates under Conditions 1-1 to 1-9 was inferred. Table 2 shows a calculation result of the inferred values of CS30 by the function or model. Also, FIG. 12 illustrates a relationship between actual measurement values of CS30 obtained with SLP measurement, and inferred values of CS30 according to the function or model. Note that Table 2 also shows the actual measurement values of CS30 of the chemically strengthened glass substrates under Conditions 1-1 to 1-9 measured by using the EPMA as the destructive inspection method, and the measured values of CS30 (SLP measured values of CS30) of the chemically strengthened glass substrates under Conditions 1-1 to 1-9 measured with SLP measurement.

(Evaluation by Sum of Squared Residuals)

The squared residual of each inferred value of CS20 by the function or model, and the sum of the squared residual of the inferred value of CS20 in each of the chemically strengthened glass substrates under Conditions 1-1 to 1-9 were calculated. A smaller sum of squared residuals can be stated as a better inference result.

Note that as comparative examples, the squared residual of each SLP measured value of CS20 and the sum of squared residuals in each of the chemically strengthened glass substrates under Conditions 1-1 to 1-9 were calculated.

Table 3 shows, for the chemically strengthened glass substrates under Conditions 1-1 to 1-9, the squared residuals of the inferred values of CS20 by the function or model and the SLP measured values of CS20, and the sum of these squared residuals.

TABLE 3

| | Squared residual | | | | |
|---|---|---|---|---|---|
| | Comp. ex. | Function | | | |
| | | Fixed condition | | | |
| Condition | SLP measured value of CS20 | Area ratio (0.68) | a2/a4 ratio (1.57) | Area ratio (0.68) and a2/a4 ratio (1.57) | Model Random forest |
| Condition 1-1 | 1939.2 | 58.3 | 425.7 | 20.2 | 9.3 |
| Condition 1-2 | 1724.1 | 11.6 | 1003.9 | 0.0 | 0.1 |
| Condition 1-3 | 1619.1 | 13.7 | 448.2 | 1.6 | 1.7 |
| Condition 1-4 | 1033.8 | 13.3 | 678.8 | 0.3 | 3.4 |
| Condition 1-5 | 1556.8 | 0.0 | 379.6 | 6.1 | 0.1 |
| Condition 1-6 | 612.4 | 59.0 | 505.4 | 17.4 | 5.7 |
| Condition 1-7 | 1658.6 | 21.3 | 737.5 | 44.2 | 14.2 |
| Condition 1-8 | 1362.9 | 0.8 | 316.9 | 1.0 | 0.9 |
| Condition 1-9 | 1106.2 | 4.5 | 420.8 | 0.1 | 32.4 |
| Sum of squared residuals (total value) | 12613.2 | 182.3 | 4916.9 | 90.9 | 67.8 |

TABLE 1

| | Actual measurement value of CS20 [MPa] | SLP measured value of CS20 [MPa] | Inferred value of CS20 [MPa] | | | |
|---|---|---|---|---|---|---|
| | | | Function | | | Model |
| | | | Fixed condition | | | |
| Condition | | | Area ratio (0.68) | a2/a4 ratio (1.57) | Area ratio (0.68) and a2/a4 ratio (1.57) | Random forest |
| Condition 1-1 | 87.8 | 131.8 | 80.1 | 108.4 | 83.3 | 84.7 |
| Condition 1-2 | 88.3 | 129.9 | 84.9 | 120.0 | 88.4 | 88.0 |
| Condition 1-3 | 90.8 | 131.0 | 87.1 | 111.9 | 89.5 | 89.4 |
| Condition 1-4 | 67.9 | 100.0 | 64.2 | 93.9 | 67.3 | 69.7 |
| Condition 1-5 | 69.5 | 109.0 | 69.7 | 89.0 | 72.0 | 69.2 |
| Condition 1-6 | 77.7 | 102.5 | 70.0 | 100.2 | 73.6 | 75.3 |
| Condition 1-7 | 56.7 | 97.4 | 61.3 | 83.8 | 63.3 | 60.4 |
| Condition 1-8 | 64.9 | 101.8 | 64.1 | 82.7 | 65.9 | 64.0 |
| Condition 1-9 | 75.3 | 108.5 | 73.1 | 95.8 | 75.6 | 69.6 |

45

TABLE 2

| | Actual measurement value of CS20 [MPa] | SLP measured value of CS20 [MPa] | Inferred value of CS20 [MPa] | | | |
|---|---|---|---|---|---|---|
| | | | Function | | | Model |
| | | | Fixed condition | | | |
| Condition | | | Area ratio (0.68) | a2/a4 ratio (1.57) | Area ratio (0.68) and a2/a4 ratio (1.57) | Random forest |
| Condition 1-1 | 86.2 | 108.7 | 84.9 | 103.1 | 84.3 | 83.8 |
| Condition 1-2 | 86.5 | 109.6 | 90.2 | 112.5 | 89.0 | 87.6 |
| Condition 1-3 | 87.8 | 108.3 | 89.8 | 106.1 | 89.4 | 88.5 |
| Condition 1-4 | 69.2 | 83.7 | 70.9 | 90.2 | 70.3 | 68.9 |
| Condition 1-5 | 68.8 | 87.4 | 73.0 | 85.5 | 72.8 | 68.4 |
| Condition 1-6 | 75.2 | 91.8 | 75.9 | 94.9 | 74.9 | 73.6 |
| Condition 1-7 | 57.9 | 81.5 | 65.9 | 80.8 | 65.5 | 61.1 |
| Condition 1-8 | 64.5 | 84.2 | 67.8 | 80.1 | 67.6 | 63.9 |
| Condition 1-9 | 73.2 | 90.4 | 76.1 | 90.5 | 75.5 | 70.1 |
| Sum of squared residuals (total value) | — | 3536.4 | 123.4 | 3475.5 | 101.8 | 30.7 |

Example 2

Production of Crystallized Glass Substrate

A glass substrate was prepared. The glass substrate contained, by oxide basis, 61.0 wt % of $SiO_2$, 8.5 wt % of $Al_2O_3$, 4.7 wt % of $P_2O_5$, 3.8 wt % of $Y_2O_3$, 10.4 wt % of $Li_2O$, 2.1 wt % of $Na_2O$, 3.4 wt % of MgO, and 6.2 wt % of $ZrO_2$. The size of the glass substrate was specified such that the principal surface was a rectangle of 50 mm×50 mm, and a thickness of 0.7 mm.

(Crystallization Process)

By applying a crystal nucleation process to the prepared glass substrate for two hours at 550° C., and then, applying a crystal growth process to the substrate for two hours at 720° C., a crystallized glass having lithium phosphate crystals as the main crystalline phase was obtained.

(Chemical Strengthening Process)

A chemical strengthening process was applied to the generated crystallized glass according to the following steps. First, the crystallized glass substrate was heated up to 410° C. and immersed in a bathtub containing molten salt in which sodium nitrate salt was dissolved for four hours, and then, the crystallized glass substrate was lifted up from the molten salt. Next, the crystallized glass substrate was heated up to 410° C., and immersed in a bathtub containing mixed molten salt in which potassium nitrate salt and lithium nitrate salt were dissolved (99.5 wt % of $KNO_3$ and 0.5 wt % of $LiNO_3$) for 60 minutes, and then, the crystallized glass substrate was lifted up from the mixed molten salt and slowly annealed down to room temperature, to obtain a chemically strengthened glass substrate.

Like the chemically strengthened glass substrates under Conditions 1-1 to 1-9 described above, chemically strengthened glass substrates under Conditions 2-1 to 2-9 (see Tables 4 and 5) were basically the glass substrate described above strengthened under the chemical strengthening conditions described, although the respective stress profiles varied depending on minute variation in the composition of the glass substrate, the placed position of the glass substrate in the bathtub, the fluctuation in impurity concentration in the molten salt or mixed molten salt (degradation by repetition), and the like.

Measurement of Stress

In substantially the same way as in the inspection methods of the chemically strengthened glass substrates under Conditions 1-1 to 1-9 described above, the stress values of the obtained chemically strengthened glass substrates under Conditions 2-1 to 2-9 were measured with two inspection methods of non-destructive inspection and destructive inspection.

Inference of CS20

(Inference by Function)

Inferred values of the stress values (CS20) at a position 20-μm deep from the position of the surface of each of the chemically strengthened glass substrates under Conditions 2-1 to 2-9, was calculated in substantially the same way as in the chemically strengthened glass substrates under Conditions 1-1 to 1-9 described above.

(Inference by Model)

As in the chemically strengthened glass substrates under Conditions 1-1 to 1-9 described above, the temperature; the time; the salt concentration of molten salt containing sodium nitrate or potassium nitrate contained in a chemical process liquid into which the glass was immersed during chemical strengthening; the type of the glass substrate; the stress values at depths of 50 μm and 90 μm from the surface of the glass substrate; the depth at which the stress value becomes zero (DOC); and the stress value (CT) at the center of the glass substrate, were taken as the explanatory variables, and by using a model on which learning was executed in advance using a random forest, CS20 was inferred.

Table 4 shows the inferred values of CS20 by the function or model.

Also, by using the function or model, in substantially the same way as described above, the stress value (CS30) at a position 30-μm deep from the position of the surface of each of the chemically strengthened glass substrates under Conditions 2-1 to 2-9 was inferred. Table 5 shows a calculation result of the inferred values of CS30 by the function or model. Note that Table 5 also shows the actual measurement values of CS30 of the chemically strengthened glass substrates under Conditions 2-1 to 2-9 measured by using the EPMA as the destructive inspection method, and the measured values of CS30 (SLP measured values of CS30) of the chemically strengthened glass substrates under Conditions 2-1 to 2-9 measured with SLP measurement.

TABLE 4

| Condition | Actual measurement value of CS20 [MPa] | SLP measured value of CS20 [MPa] | Inferred value of CS20 [MPa] | | | |
|---|---|---|---|---|---|---|
| | | | Function | | | Model |
| | | | Fixed condition | | | |
| | | | Area ratio (1.31) | a2/a4 ratio (1.22) | Area ratio (1.31) and a2/a4 ratio (1.22) | Random forest |
| Condition 2-1 | 373.8 | 223.6 | 322.7 | 299.9 | 322.1 | 365.5 |
| Condition 2-2 | 379.5 | 223.5 | 332.7 | 307.1 | 332.2 | 365.2 |
| Condition 2-3 | 377.7 | 233.4 | 347.1 | 316.1 | 346.7 | 365.8 |
| Condition 2-4 | 227.4 | 147.3 | 248.8 | 170.9 | 248.4 | 233.0 |
| Condition 2-5 | 237.3 | 156.9 | 245.5 | 146.3 | 245.3 | 236.3 |
| Condition 2-6 | 254.6 | 164.1 | 238.6 | 166.4 | 238.2 | 256.0 |
| Condition 2-7 | 196.5 | 124.6 | 207.7 | 108.6 | 207.5 | 204.0 |
| Condition 2-8 | 208.3 | 139.8 | 218.6 | 122.1 | 218.3 | 206.7 |
| Condition 2-9 | 213.3 | 147.3 | 233.6 | 147.7 | 233.4 | 208.5 |
| Sum of squared residuals (total value) | — | 102986.6 | 7166.7 | 53203.4 | 7262.8 | 530.3 |

TABLE 5

| Condition | Actual measurement value of CS20 [MPa] | SLP measured value of CS20 [MPa] | Inferred value of CS20 [MPa] | | | |
|---|---|---|---|---|---|---|
| | | | Function | | | Model |
| | | | Fixed condition | | | |
| | | | Area ratio (1.31) | a2/a4 ratio (1.22) | Area ratio (1.31) and a2/a4 ratio (1.22) | Random forest |
| Condition 2-1 | 342.7 | 263.5 | 307.0 | 292.0 | 307.1 | 333.9 |
| Condition 2-2 | 347.9 | 266.3 | 314.0 | 297.2 | 314.1 | 333.8 |
| Condition 2-3 | 345.9 | 265.9 | 323.6 | 303.1 | 323.7 | 333.9 |
| Condition 2-4 | 225.4 | 170.4 | 237.9 | 185.9 | 237.9 | 230.2 |
| Condition 2-5 | 232.3 | 178.2 | 235.8 | 169.5 | 235.9 | 232.5 |
| Condition 2-6 | 250.0 | 185.5 | 232.2 | 184.0 | 232.3 | 248.6 |
| Condition 2-7 | 199.8 | 144.5 | 203.5 | 138.0 | 203.6 | 205.3 |
| Condition 2-8 | 208.7 | 155.1 | 210.0 | 146.0 | 210.1 | 206.9 |
| Condition 2-9 | 210.8 | 162.4 | 220.1 | 163.4 | 220.2 | 208.1 |
| Sum of squared residuals (total value) | — | 37726.4 | 3504.4 | 26842.8 | 3492.8 | 484.3 |

As illustrated in FIG. 10, at depths of approximately 70 μm or shallower from the position of the surface of the chemically strengthened glass substrate under Condition 1-1, stress values obtained by the SLP measurement started showing fluctuation and variation, and the difference from the stress values obtained by the EPMA became greater. For example, the stress value at a point 20-μm deep from the surface obtained by the SLP measurement in Condition 1-1 of the chemically strengthened glass substrate was approximately 131 MPa, whereas the stress value as the true value obtained by the destructive inspection was 87 MPa, and there was a large deviation. Therefore, at the depths of approximately 70 μm or shallower from the position of the surface of the chemically strengthened glass substrate under Condition 1-1, it was confirmed that the stress value obtained by the SLP measurement was less accurate than the stress value obtained by destruction. In particular, at a depth of approximately 20 μm from the position of the surface of the chemically strengthened glass substrate under Condition 1-1, the stress value obtained by the SLP measurement was significantly different from the stress value obtained by the EPMA, and it was confirmed that the accuracy was particularly low.

From Table 1, the inferred value of CS20 inferred by using either the function or the model is closer to the actual measurement value of CS20 obtained by the EPMA than the SLP measured value of CS20. Therefore, by using the function in Formula (1) described above or the model for the stress values obtained by the SLP measurement at depths of 50 μm to 350 μm from the position of the surface of the chemically strengthened glass substrates under Conditions 1-1 to 1-9, it was confirmed that the inferred value of CS20 was a numerical value that can be inferred with good accuracy to be close to the stress value as the reference or target of CS20 at the depth position of each of the chemically strengthened glass substrates under Conditions 1-1 to 1-9. Also, from Table 2, it was confirmed that the inferred value of CS30 was also a numerical value that can be inferred with good accuracy to be close to the stress value as the reference or target of CS30 at the depth position of each of the chemically strengthened glass substrates under Conditions 1-1 to 1-9, like the inferred value of CS20.

Also, from Table 3, the sum of squared residuals of the inferred values of CS20 inferred by using either the function or the model, was a numerical value significantly lower than the sum of squared residuals of the SLP measured value of CS20, and thus, significantly improved compared to the sum of squared residuals of the SLP measured value of CS20. Therefore, it can be stated that the inferred value of CS20 inferred by using either the function or the model is a numerical value that can be inferred with high accuracy to be very close to the stress value as the reference or target of CS20 than the SLP measured value of CS20. In particular, when using the function, in the case where the area ratio of Formula (2) described above was fixed, and in the case where both the area ratio of Formula (2) described above and the a2/a4 ratio were fixed, the sum of squared residuals of the obtained inferred values of CS20, and the sum of squared residuals of the inferred values of CS20 inferred by using the model exhibited particularly low numerical values. Therefore, it can be stated that the inferred value of CS20 obtained by fixing the area ratio of Formula (2) described above or by fixing both the area ratio of Formula (2) described above and the a2/a4 ratio when using the function, and the inferred value of CS20 obtained using the model, are numerical values that can be inferred with even higher accuracy to be very close to the stress value as the reference or target of CS20 at the depth position of each of the chemically strengthened glass substrates under Conditions 1-1 to 1-9.

Also, from Table 4 and Table 5, even in the case where a crystallized glass substrate was chemically strengthened, it was confirmed that the inferred values of CS20 and CS30 are numerical values that can be inferred with good accuracy to be close to the stress values as the reference or target of CS20 and CS30 at the depth positions of each of the chemically strengthened glass substrates under Conditions 2-1 to 2-9. In other words, also in the crystallized glass, as in the non-crystallized glass substrate in Example 1, at depths of approximately 70 μm or shallower from the position of the surface of the chemically strengthened glass substrate under Condition 2-1, stress values obtained by the SLP measurement started showing fluctuation and variation, and the difference from the stress values obtained by the EPMA became greater. Therefore, at the depths of approximately 70 μm or shallower from the position of the surface of the chemically strengthened glass substrate under Condition 2-1, the stress value obtained by the SLP measurement is less accurate than the stress value obtained by destruction. In particular, at depths approximately 20 μm and approximately 30 μm from the position of the surface of the chemically strengthened glass substrate under Condition 2-1, the stress value obtained by the SLP measurement differs greatly from the stress value obtained by the EPMA, and the accuracy becomes particularly low. Even in the chemically strengthened crystallized glass substrates, the inferred values of CS20 and CS30 inferred using either the function or the model were closer to the actual measurement values of CS20 and CS30 obtained by the EPMA than the SLP measured values of CS20 and CS30. Therefore, by using the function in Formula (1) described above or the model for the stress values obtained by the SLP measurement at depths of 50 µm to 350 µm from the position of the surface of the chemically strengthened glass substrates under Conditions 2-1 to 2-9, it can be stated that the inferred values of CS20 and CS30 are numerical values that can be inferred with good accuracy to be close to the stress values as the reference or target of CS20 and CS30.

Therefore, when inferring a stress value of a chemically strengthened glass substrate, a stress value in a region located 50 µm or shallower from the surface of the chemically strengthened glass can be inferred highly accurately, by using a temperature and a time used upon chemical strengthening, and stress values at three or more depth positions 20 µm or deeper from the surface of a glass chemically strengthened with the temperature and the time.

As above, the embodiments have been described; note that the embodiments described above are presented as examples and the present inventive concept is not limited by the embodiments described above. As described above, the embodiments can be implemented in various other forms, and various combinations, omissions, replacements, changes, and the like can be made without departing from the gist of the inventive concept. These embodiments and variations of these are included in the scope and gist in the present inventive concept, and included within the scope in the present disclosure described in the claims and their equivalents.

The invention claimed is:

1. A method of determining a stress value in a region located 50 µm or shallower from a surface of a chemically strengthened glass having a thickness of 0.2 mm or greater, the method comprising:
   measuring a stress value at three or more different depth positions 20 µm or deeper from the surface of the chemically strengthened glass; and
   determining, based on the measured stress values and a temperature and a time used during chemical strengthening, the stress value in a region located 50 µm or shallower from the surface of the chemically strengthened glass.

2. The method of claim 1, wherein the determining is performed by using a result of measuring one or more training samples that have been chemically strengthened under chemical strengthening conditions of ranges of ±30° C., ±1 hour, and ±10% with respect to a temperature, a time, and a salt concentration, respectively.

3. The method of claim 2, wherein the determining involves using the stress values at the three or more different depth positions applied to a function having three terms or more.

4. The method of claim 3, wherein two or more terms of the function having the three terms or more use at least one selected from the group consisting of a complementary error function and an error function.

5. The method of claim 3, wherein the function having the three terms or more is Formula (1) as follow:

$$\sigma(x) = a_1 \cdot \mathrm{erfc}(a_2 \cdot x) + a_3 \cdot \mathrm{erfc}(a_4 \cdot x) + a_5 \ldots \quad (1)$$

where $\sigma$ is a stress value in a depth direction from the surface of the chemically strengthened glass; x is a depth from the surface of the chemically strengthened glass; and a1 to a5 are parameters used for prediction.

6. The method of claim 5, wherein a5 in the Formula (1) is included within a range expressed by Formula (2) as follows, based on the one or more training samples:

$$0.5 \leq \left| \frac{\int_0^{DOC} \sigma(x)dx}{\int_{DOC}^{\frac{T}{2}} \sigma(x)dx} \right| \leq 1.5 \quad (2)$$

where x is a depth from the surface of the chemically strengthened glass; T is a thickness of the chemically strengthened glass; DOC is a depth of a compressive stress layer; and $\sigma$ is a function defined as the Formula (1) wherein the same formula is used for a numerator and a denominator.

7. The method of claim 5, wherein a ratio of a2 to a4 in Formula (1) is fixed based on the one or more training samples.

8. The method of claim 3, wherein the stress value to be determined in the determining includes stress values at depths of 0 µm, 10 µm, 20 µm, 30 µm, and 40 µm from the surface of the chemically strengthened glass, and gradients between the stress values at the respective depths.

9. The method of claim 2, wherein the stress value in the region located 50 µm or shallower from the surface of the chemically strengthened glass is determined by a model using the stress values at the three or more different depth positions based on the one or more training samples.

10. The method of claim 9, wherein a number of the stress values at the three or more different depth positions is three to 20.

11. The method of claim 9, wherein the stress value in the region located 50 µm or shallower from the surface of the chemically strengthened glass is determined such that an absolute value of an area ratio of a region where the stress value is positive to a region where the stress value is negative determined in a stress profile representing a relationship between depths from the surface of the chemically strengthened glass and stress values, is in a range of 0.5 to 1.5.

12. The method of claim 1, further comprising:
   outputting the stress value determined in the determining.

13. A method of manufacturing a chemically strengthened glass including one or more chemical strengthening steps, wherein a glass is chemically strengthened to obtain the chemically strengthened glass, the method comprising:
   generating stress at positions located deeper than 20 µm from a surface of the glass by executing chemical strengthening at least once;
   determining an SLP measured value by executing SLP measurement of the stress of the glass;
   applying the inference method as claimed in claim 1 to the SLP measured value, to infer a stress value at a depth of 50 µm or shallower from a surface layer of the glass; and
   adjusting by executing, based on the inferred stress value, at least one of adjustment of a temperature or a time in at least one chemical strengthening step, and adjustment of a concentration of salt in at least one chemical strengthening step.

14. A non-transitory computer-readable recording medium having computer-readable instructions stored thereon, which when executed, cause a computer including a memory and a processor to execute a method of determining a stress value in a region located 50 μm or shallower from a surface of a chemically strengthened glass having a thickness of 0.2 mm or greater, the method comprising:
  measuring a stress value at three or more different depth positions 20 μm or deeper from the surface of the chemically strengthened glass; and
  determining, based on the measured stress values and a temperature and a time used during chemical strengthening, the stress value in a region located 50 μm or shallower from the surface of the chemically strengthened glass.

15. A device comprising:
  a memory; and
  a processor configured to measure a stress value at three or more different depth positions 20 μm or deeper from a surface of a chemically strengthened glass; and
  determine, based on the measured stress values and a temperature and a time used during chemical strengthening, the stress value in a region located 50 μm or shallower from the surface of the chemically strengthened glass.

* * * * *